US008612806B2

(12) United States Patent  (10) Patent No.: US 8,612,806 B2
Rossi  (45) Date of Patent: Dec. 17, 2013

(54) SYSTEMS AND METHODS FOR RECORDING USER INTERACTIONS WITHIN A TARGET APPLICATION

(75) Inventor: Claude Rossi, Valbonne (FR)

(73) Assignee: SAP AG, Walldorf (DE)

( * ) Notice: Subject to any disclaimer, the term of this patent is extended or adjusted under 35 U.S.C. 154(b) by 220 days.

(21) Appl. No.: 13/328,799

(22) Filed: Dec. 16, 2011

(65) Prior Publication Data
US 2013/0159784 A1    Jun. 20, 2013

(51) Int. Cl.
G06F 11/00    (2006.01)

(52) U.S. Cl.
USPC .............................. 714/47.1; 714/48

(58) Field of Classification Search
USPC ............ 714/47.1, 48, 38.1; 715/700, 762
See application file for complete search history.

(56) References Cited

U.S. PATENT DOCUMENTS

| | | | |
|---|---|---|---|
| 6,889,337 B1 * | 5/2005 | Yee | 714/1 |
| 7,412,349 B2 | 8/2008 | Moser et al. | |
| 7,421,683 B2 * | 9/2008 | Robertson et al. | 717/130 |
| 7,840,851 B2 | 11/2010 | Hayutin | |
| 7,930,683 B2 | 4/2011 | Li | |
| 7,962,799 B2 | 6/2011 | Lauer et al. | |
| 8,001,468 B2 | 8/2011 | Khaladkar et al. | |
| 8,056,057 B2 | 11/2011 | Larab et al. | |
| 8,370,715 B2 * | 2/2013 | Hafner et al. | 714/769 |
| 2004/0145607 A1 * | 7/2004 | Alderson | 345/746 |
| 2007/0220341 A1 | 9/2007 | Apostoloiu et al. | |
| 2010/0042929 A1 * | 2/2010 | Berry et al. | 715/738 |
| 2010/0325492 A1 | 12/2010 | Isaacs et al. | |
| 2010/0332535 A1 | 12/2010 | Weizman et al. | |
| 2011/0283148 A1 | 11/2011 | Rossi | |
| 2013/0159890 A1 | 6/2013 | Rossi | |

OTHER PUBLICATIONS

SAP, "Automate Application Testing—Improve Software Quality and Reduce Testing Costs", 2010, 4 pages.
SAP, "Sara Lee—Increasing Business Continuity After an Upgrade Via SAP Test Acceleration and Optimization", 2010, 4 pages.

* cited by examiner

*Primary Examiner* — Dieu-Minh Le
(74) *Attorney, Agent, or Firm* — Brake Hughes Bellermann LLP

(57) ABSTRACT

A method includes executing instructions recorded on a non-transitory computer-readable storage media using at least one processor. The method includes receiving a notification of a selection of an user interface (UI) element within a UI of a target application, generating a request for an element listener instance, notifying multiple test recorder hooks of the request for the element listener instance, where each of the test recorder hooks is associated with a specific UI format having multiple different element listeners depending on a type of selected UI element, creating the element listener instance by one of the test recorder hooks based on the UI format and the selected UI element, registering, by the element listener instance, for events associated with the UI element and recording the events.

20 Claims, 17 Drawing Sheets

1100

```
public class EntrySelectItem: AbstractEntry, IEntry
{
  private string theId;
  private string theKey;
  ...

public string ComponentName
  {
    get
    {
      return "Controls/Combobox/SelectItem";
    }
  }
  public string Uri
  {
    get
    {
      return "id="+theId;
    }
  }
  public string Key
  {
    get
    {
      return theKey;
    }
  }
}
```

Title: | Dr.          ▼ |
        | 1802 ↓         |
        | Dr.            |
        | Mr.            |
        | Ms.            |

FIG. 19

SYSTEMS AND METHODS FOR RECORDING USER INTERACTIONS WITHIN A TARGET APPLICATION

CROSS REFERENCE TO RELATED APPLICATION

This application is related to U.S. patent application Ser. No. 13/328,735, filed on the same date herewith, and titled "Systems and Methods For Identifying User Interface Elements," which is hereby incorporated by reference in its entirety.

TECHNICAL FIELD

This description relates to systems and techniques for recording user interactions within a target application.

BACKGROUND

Known test automation tools can be used to define test scenarios and to control execution of these test scenarios related to an application targeted for verification (e.g., verification testing). These known test automation tools may support automation of tasks such as application installation, test scenario creation, user interface (UI) interaction, problem detection (such as parsing, pulling agents, etc.), defect logging, comparison of actual outcomes to predicted outcomes, setting up of test pre-conditions, and/or other test control and/or test reporting functions. These known test automation tools can also be configured to record, as a test scenario, user interactions (e.g., native events raised by an operating system (OS) in response to a user interaction) with a user interface (e.g., a graphical user interface) of an application targeted for testing. Hence, the test scenario can be created for the application via the user interface, and the application can be tested via the user interface based on the test scenario.

Existing tools may provide a basic recorder that is capable of recording low-level UI events such as, for example, mouse clicks and keyboard inputs. The test generated with these tools and this approach may be poor in terms of semantics. For example, the tester cannot distinguish easily the click on a button from a click on a link. In addition, the flexibility of hypertext mark-up language (HTML) content generated by a UI framework that is running on a server may present difficulties in collecting information required to be able to play the recorded action again. Thus, it may be desirable to provide systems and techniques to address shortfalls of present technology, and to provide other new and innovative features.

SUMMARY

According to one general aspect, a method includes executing instructions recorded on a non-transitory computer-readable storage media using at least one processor. The method includes receiving a notification of a selection of an user interface (UI) element within a UI of a target application, generating a request for an element listener instance, notifying multiple test recorder hooks of the request for the element listener instance, where each of the test recorder hooks is associated with a specific UI format having multiple different element listeners depending on a type of selected UI element, creating the element listener instance by one of the test recorder hooks based on the UI format and the selected UI element, registering, by the element listener instance, for events associated with the UI element and recording the events.

Implementations may include one or more of the following features. For example, notifying the multiple test recorder hooks may include iterating the request for the element listener instance through a list of registered test recorder hooks until one of the registered test recorder hooks returns the element listener instance. Creating the element listener instance may include collecting information from a current UI context, and using the current UI context to determine the element listener instance. Registering the events associated with the UI element may include collecting information specific to the UI element to enable future playback of actions performed against the UI element in a generated test scenario.

The method may further include capturing semantics of the UI element within the UI of the target application and generating one or more tests having test components using the semantics. The method may further include encapsulating the collected information and creating an instance of the encapsulated collected information and adding the instance of the encapsulated collected information to a repository to enable generation of the test scenario using the instance of the encapsulated collected information. The method may further include highlighting the UI element for which the element listener instance was created.

In another general aspect, a non-transitory computer-readable storage medium stores instructions that when executed cause a processor to perform a process. The instructions include instructions to receive a notification of a selection of an user interface (UI) element within a UI of a target application, generate a request for an element listener instance, notify multiple test recorder hooks of the request for the element listener instance, where each of the test recorder hooks is associated with a specific UI format having multiple different element listeners depending on a type of selected UI element, create the element listener instance by one of the test recorder hooks based on the UI format and the selected UI element, register, by the element listener instance, for events associated with the UI element and record the events.

Implementations may include one or more of the following features. For example, the instructions to notify the multiple test recorder hooks may include instructions to iterate the request for the element listener instance through a list of registered test recorder hooks until one of the registered test recorder hooks returns the element listener instance. The instructions to create the element listener instance may include instructions to collect information from a current UI context and use the current UI context to determine the element listener instance. The instructions to register the events associated with the UI element may include instructions to collect information specific to the UI element to enable future playback of actions performed against the UI element in a generated test scenario.

The non-transitory computer-readable storage medium may further include instructions to capture semantics of the UI element within the UI of the target application and generate one or more tests having test components using the semantics. The non-transitory computer-readable storage medium may further include instructions to encapsulate the collected information and creating an instance of the encapsulated collected information and add the instance of the encapsulated collected information to a repository to enable generation of the test scenario using the instance of the encapsulated collected information. The non-transitory computer-readable storage medium may further include instructions to highlight the UI element for which the element listener instance was created.

In another general aspect, a computer system includes instructions stored on a non-transitory computer-readable storage medium. The computer system includes a recorder interface configured to receive a notification of a selection of an user interface (UI) element within a UI of a target application, generate a request for an element listener instance, and notify multiple test recorder hooks of the request for the element listener instance. The computer system includes multiple test recorder hooks, where each of the test recorder hooks is associated with a specific UI format having multiple different element listeners depending on a type of selected UI element and is configured to create the element listener instance based on the UI format and the selected UI element and the element listener instance configured to register for events associated with the UI element and to record the events.

Implementations may include one or more of the following features. For example, the recorder interface may be configured to iterate the request for the element listener instance through a list of registered test recorder hooks until one of the registered test recorder hooks returns the element listener instance. The test recorder hook may be configured to collect information from a current UI context and use the current UI context to determine the element listener instance. The element listener instance may be configured to collect information specific to the UI element to enable future playback of actions performed against the UI element in a generated test scenario. The element listener instance may be configured to capture semantics of the selection of the UI element with the UI of the target application and generate one or more tests having test components using the semantics. The computer system may further include an entry interface configured to encapsulate the collected information and create an instance of the encapsulated collected information and add the instance of the encapsulated collected information to a repository to enable generation of the test scenario using the instance of the encapsulated collected information.

The details of one or more implementations are set forth in the accompanying drawings and the description below. Other features will be apparent from the description and drawings, and from the claims.

BRIEF DESCRIPTION OF THE DRAWINGS

FIG. 11 is an exemplary code snippet illustrating an entry implementation example.

FIG. 18 is an exemplary screenshot of a target application displaying fields in a contact screen.

FIG. 19 is an exemplary screenshot of a combo-box drop-down item.

DETAILED DESCRIPTION

Figure 1:
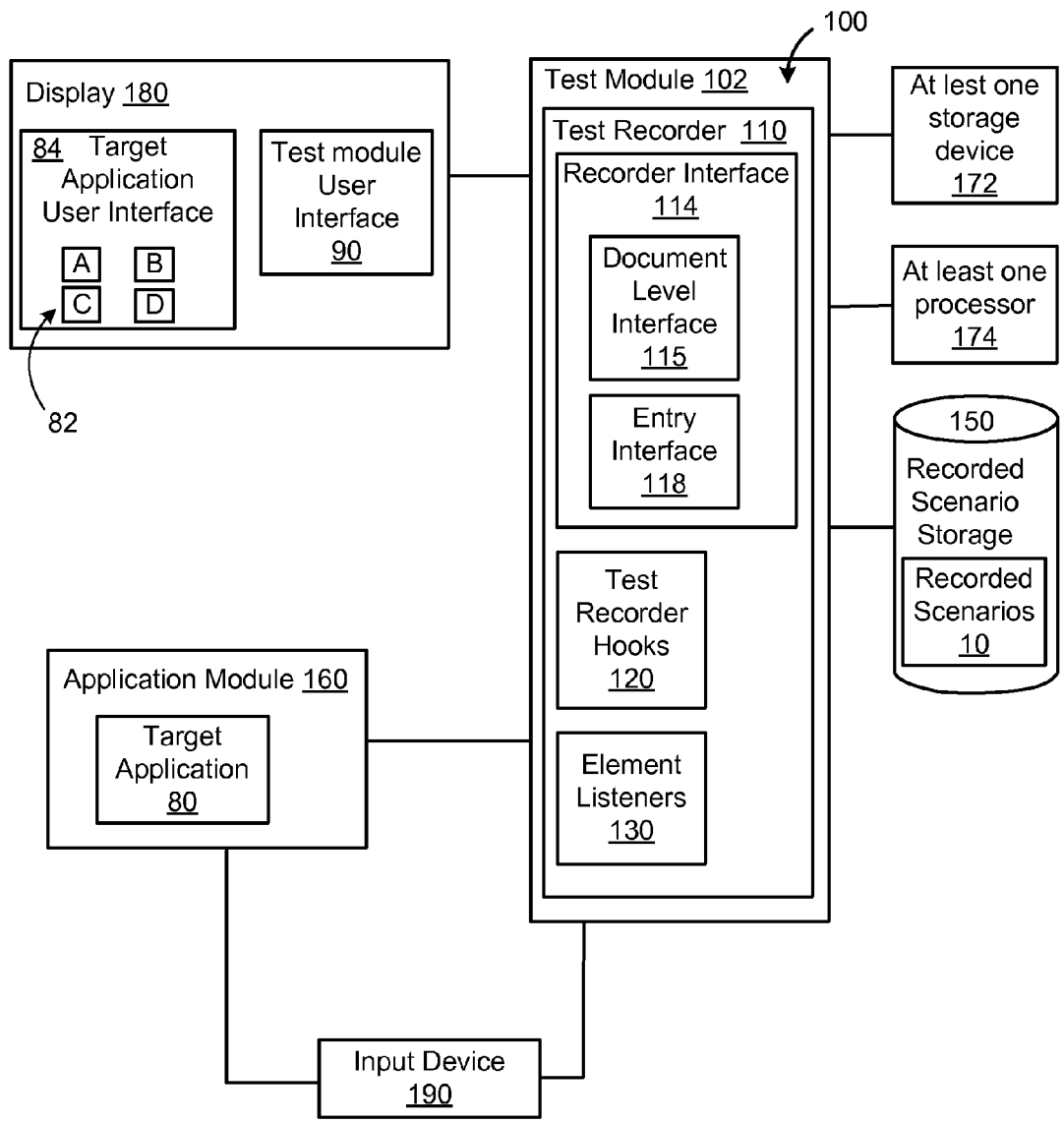
FIG. 1 is an exemplary block diagram that illustrates a test module configured to record events based on interactions of a user with user interface elements of a target application.

FIG. 1 is an exemplary block diagram that illustrates a test module 100 configured to record a recorded scenario 10 based on interactions of a user (not shown) with user interface elements 82 of a target application 80. As shown in FIG. 1, the user interface elements 82 of the target application 80 can collectively define a target application user interface 84 of the target application 80. In some exemplary implementations, the target application 80 may be, for example, a financial application, a business process application, a human resources application, an engineering application, a customer relations management application, a supply chain management application, and/or any other type of application. In some exemplary implementations, the target application 80 may be an enterprise application. In this exemplary implementation, one or more portions of the target application 80 may be executed, or triggered for execution, using an application module 160. Although not shown in FIG. 1, the application module 160 may include one or more processors and/or memory components.

The user interface elements 82 of the target application 80 may be associated with (e.g., configured to trigger, configured to control, etc.) any function of the target application 80. For example, the user interface elements 82 (which define the target application user interface 84) may be configured to managed, can represent, and/or be triggered by one or more functions of the target application 80. The user interface elements 82 of the target application 80 (which includes user interface elements A through D) may be any type of user interface element that can be associated with a user interface (e.g., graphical user interface (GUI)). For example, the user interface elements 82 may be, or may include, visual indicators, images, text-based objects, menus, links (e.g., hyperlinks), buttons, fields, command-line interfaces, check boxes, and other types of user interface elements.

Interactions with the user interface elements 82 of the target application 80 may be performed using an input device 190 (via the application module 160), which may be, for example, a keyboard device, a mouse device, an electro static touchpad device, and/or other types of input devices. User interactions (also may be referred to as events) may include, for example, inserting text into one or more user interface elements 82, selecting one or more of the user interface elements 82, moving one or more of user interface elements 82, accessing functionality associated with one or more of the user interface elements 82, and/or other types of interactions.

As one exemplary interaction, user interface element C may be a field into which alpha-numeric characters may be entered by a user of the target application 80 via the device 190. In some exemplary implementations, one or more of the user interface elements 82 may be referred to as a user interface control, or as a user interface object. As shown in FIG. 1, the user interface elements 82 that define the target application user interface 84 may be displayed (e.g., rendered) within a display 180.

Also, as shown in FIG. 1, a test module user interface 90 is displayed (e.g., rendered) within the display 180. The test module user interface 90 may be associated with (e.g., may be configured to manage, may represent, may be triggered by) one or more functions of the test module 100. Although not shown in FIG. 1, the test module user interface 90, similar to the target application user interface 84, may include one or more user interface elements.

In one exemplary implementation, the target application 80 may be implemented using a browser application. For instance, the target application 80 may implemented within the framework of a browser application such that the target application 80 is accessible through the Internet. In other exemplary implementations, the target application 80 may be a stand alone application that is accessible over a network including, for example, the Internet.

The target application 80 may be implemented using one or more different frameworks. For example, the target application may be implemented using one or more different UI frameworks, where each of the different UI frameworks may generate HTML content using different Web technologies.

The test module 100 may be implemented as a stand alone module or, in one exemplary implementation, may be implemented as part of an application or a group of application modules. For example, the test module 100 and its related functionality may be implemented as part of SAP Solution Manager. In this example, an example target application 80 may include the SAP CRM Solution application and the test module 100 may be used to automate the testing of the SAP CRM Solution application, which may be built on top of a WebCUIF Framework. In other examples, the target application 80 may include other SAP applications, including ones built on top of the Web Dynpro Framework and the test module 100 may be used to automate the testing of these other applications. Additionally, other illustrated components, including the recorded scenario storage 150, may be implemented as part of the SAP Solution Manager.

The test module 100 may be configured to record (e.g., collect) user interactions with the user interface elements 82 of the target application 80. One or more recorded scenario 10 of the target application 80 may be defined and stored based on recording a sequence of user interactions (triggered using the input device 190) with the user interface elements 82 of the target application 80 to perform a particular function (e.g., a business task, trigger a calculation, etc.) of the target application 80. After the recorded scenario 10 has been captured, the recorded scenario 10 may be converted to a test scenario file (not shown) at a later time to test (e.g., verify) the particular function of the target application 80 as triggered by the sequence of user interactions recorded in the recorded scenario 10. The converted test scenario files may be used to execute the generated test to check and validate existing applications and new applications including, for example, new versions of the target application 80.

The test module 100 may be configured to enable testers (users who are validating the target application 80) to record different interaction scenarios with the target application 80 for storage in the recorded scenario storage 150 as a recorded scenario 10. The test module 100 may include a test recorder module 110 (also referred to as the test recorder 110) to carry out the functionality of recording such interactions with a target application 80 and the user interactions with the user interface elements 82. The test recorder 110 may be configured to collect enough information to make it possible to identify a targeted UI element within a target application 80. The target application 80 may include a UI hierarchy (different levels of the UI) where user interface elements may be displayed and included in various levels of the UI hierarchy. The collection of such information may be complex and depend on a particular technology used to generate the user interface and the UI hierarchy. The test recorder 110 may be configured to record the user interactions with the user interface elements 82 and at the same time understand the semantics of the particular user interface elements such that the recorded scenarios 10 include comprehensive information to allow the generation of test scenarios using the recorded events.

The test recorder module 110 includes a recorder interface 114, a test recorder hooks module 120 (also referred to as test recorder hooks 120) and an element listeners module 130 (also referred to as element listeners 130). The recorder interface 114 may be implemented as one or more application programming interfaces (APIs) that are configured to interact with one or more APIs and/or other interfaces exposed by the target application 80 including the target application user interface 84 and the test module user interface 90.

In some exemplary implementations, the recorder interface 114 may be configured to register with a target application 80 and/or a browser application to enable the test recorder 110 to be notified of user interactions with the user interface elements 82 of the target application 80. The recorder interface 114 also interfaces with the other modules of the test recorder 110 including the test recorder hooks 120 and the element listeners 130 to provide those components with information regarding user interactions with the user interface elements 82. The recorder interface 114 also may interface with the recorded scenario storage 150 to pass recorded events in a designated format to the recorded scenario storage 150.

The recorder interface 114 includes a document level interface module 116 (also referred to as a document level interface 116) and an entry interface module 118 (also referred to as an entry interface 118). The document level interface 116 may be configured to register with one or more APIs associated with the target application 80 to receive notifications of user interactions within the target application 80 including user interactions with the user interface elements 82. The document level interface 116 may enable the test recorder 110 to listen for events at various hierarchies including at the application level and at the document level. The document level interface 116 may provide notifications when an item (e.g., application, document, user interface element) is selected and in focus to the test module 100 and, more specifically, to the test recorder 110. The document level interface 116 may provide notifications when an item (e.g., application, document, user interface element) is no longer in focus such as when a user has selected another item and the other item is in focus.

The entry interface 118 may be configured to receive and prepare recorded events for storage as a recorded scenario 10 in the recorded scenario storage 150. Then entry interface 118 may collect and encapsulate the information and/or place it in a format suitable for storage in the recorded scenario storage 150.

The test recorder 110 also interfaces with the test module user interface 90 to record user interactions on the target application user interface 84. While the test module user interface 90 is illustrated within the display 180, the test module user interface 90 and some of its components may be located elsewhere and may be considered a part of the test module 100. The test module user interface 90 may be configured to control the recording user interactions and may include one or more user interface elements to control the recording process.

In one exemplary implementation, the test recorder 110 may generate the request for the element listener based on the notification of the selection of a particular UI element, as notified by the recorder interface 114. The recorder interface 114 may notify the test recorder hooks 120 of the request for the element listener. The test recorder hooks module 120 may include multiple different test recorder hooks, where each of the test recorder hooks is based upon a different UI technology or UI framework with which the target application 80 may have been developed and/or generated.

For example, many webpages may use HTML as the language in which the content is displayed in the target application 80 and the target application user interface 84. The HTML language and presentation of the content may be developed using one or more different technologies to generate the display of the content. The test recorder hooks within the test recorder hooks module 120 are configured to understand the semantics associated with the underlying UI technology used to generate the HTML content in the target application user interface 84 and specifically the user interface elements 82. The underlying UI technology also may be referred to as a specific UI format that is used to generate the user interface elements 82 on the target application user interface 84.

Each of the test recorder hooks may be associated with a specific UI format. Additionally, the element listeners module 130 may include multiple different element listener classes based on the particular UI format that is selected. Thus, each of the test recorder hooks may be associated with multiple different element listeners within the element listeners module 130. That is, the test recorder hooks for a specific UI technology each may have a set of element listeners from the element listeners module 130 depending on the particular type of user interface element 82.

The test recorder hooks module 120 may be configured to create the element listener based on the UI format and the selected UI element. The created element listener may register events associated with the selected UI element, such as, a user interface element selected from the group of user interface elements 82. The test recorder hooks and the associated element listeners are configured to record the events input by a user using the input device 190 and include particular semantic information to enable future playback of the UI element in a generated test scenario. The recorded events are stored in the recorded scenario storage 150 in a recorded scenario 10 using the entry interface 118. At a later time, the recorded scenario 10 may be converted to a test scenario such that the collected information specific to the UI element is generated and played back in a repeatable manner in a future testing of either the same target application 80 or a revised version of the target application 80.

The test module 100 may be operably connected to at least one storage device 172 and at least one processor 174. While illustrated as connected to the test module 100, the storage device 172 and the processor 174 may be connected to or operably coupled to, either physically or logically, all of the components illustrated in FIG. 1. The storage device 172 may be any type of storage device or memory module or multiple memory modules that are used to store instructions for processing by the processor 174. The storage device 172 may include RAM, ROM, or any other type of storage device. The storage device 172 may be a non-transitory computer-readable storage medium. The processor 174 may be configured to execute the instructions on the storage device 172 and cause the other components illustrated in FIG. 1 to perform one or more various actions as described throughout this document.

Figure 2:
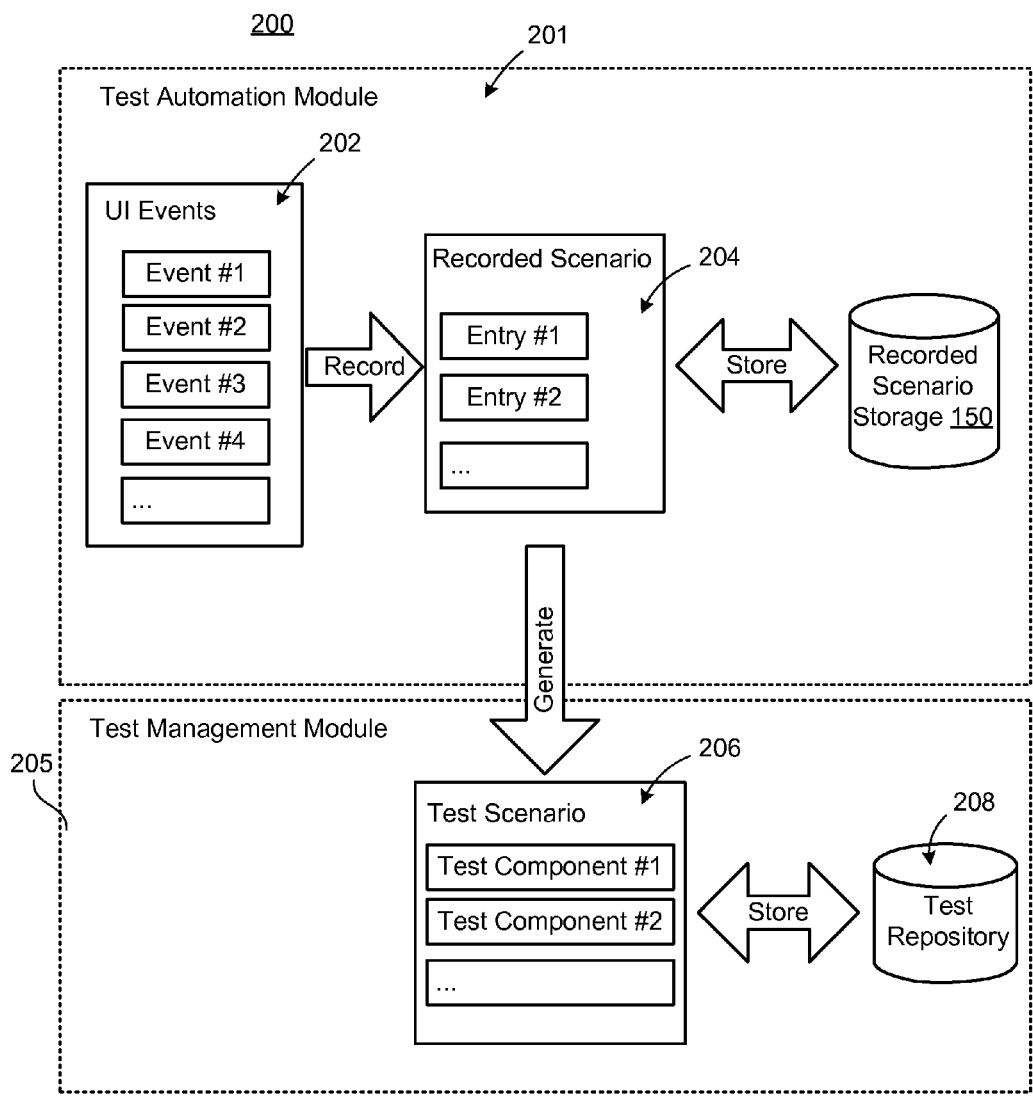
FIG. 2 is an exemplary block diagram that illustrates a test scenario flow of recording the interactions of a user with user interface elements and storing them in a repository.

Referring to FIG. 2, is an exemplary block diagram that illustrates a test scenario flow 200 (or test automation flow 200) of recording the interactions of a user with user interface elements and storing them in a repository. The test automation flow 200 illustrates an example process by which user interactions with a target application on a target application user interface are recorded for storage. The recorded user interactions may then be converted into a test scenario and stored for later playback and testing of future or other target applications. In this manner, a tester of a target application may record one or more series of user interactions that, when compiled or combined together, define a particular business scenario related to the target application.

In one exemplary implementation, a tester, or a test engineer, may record a particular scenario by using the target application in the same manner that a regular user would be expected to use the target application. The UI events 202 may include one or more events that are representative of user interactions with the target application (e.g., target application 80 of FIG. 1) on the target application user interface (e.g., target application user interface 84 of FIG. 1) and the interaction with the user interface elements (e.g., user interface elements 82 of FIG. 1). Each illustrated event number (e.g., Event #1, Event #2, Event #3, Event #4, etc.) may represent a specific interaction with a user interface element. While recording the native UI events 202, the application triggers are intercepted by the test module 100 and added as entries in the recorded scenario storage 150. Each recorded scenario 204 that is intercepted may include one or more entries (e.g., Entry #1, Entry #2, etc.) that may or may not correspond on a one for one basis with the events in the UI events 202. In one exemplary implementation, multiple UI events 202 may be combined prior to or during the test recorder recording of the entries into a single recorded entry 204. A group of recorded scenario entries may be stored as a recorded scenario 10 in the recorded scenario storage 150.

Once the recorded scenario 10 is stored in the recorded scenario storage 150, a test scenario may be generated using the recorded scenario 10. For example, a test framework module 205 may be used to create a test scenario 206 that includes one or more test components (e.g., Test Component #1, Test Component #2, etc.). The test scenario 206 with the test components then may be stored in a test repository 208. The test scenario 206 that is stored in the test repository 208 may then be played back to test other target applications including, for example, newer versions of a target application that was used to create the test scenario.

The test scenario 206 may be an aggregation of test components. Each entry of the recorded scenario 204 that is stored in the recorded scenario 10 may correspond to one test component of the generated test scenario 206. The test automation module 201 can connect to different test management modules 205. Each test management module 205 may rely on a specific format for defining and storing test scenarios 206. In one exemplary implementation, the test automation module 201 may export and store tests in HP Quality Center using the HP format. In other exemplary implementations, the test automation module 201 also may export and store tests in "SAP Solution Manager" using a SAP format.

Figure 3:
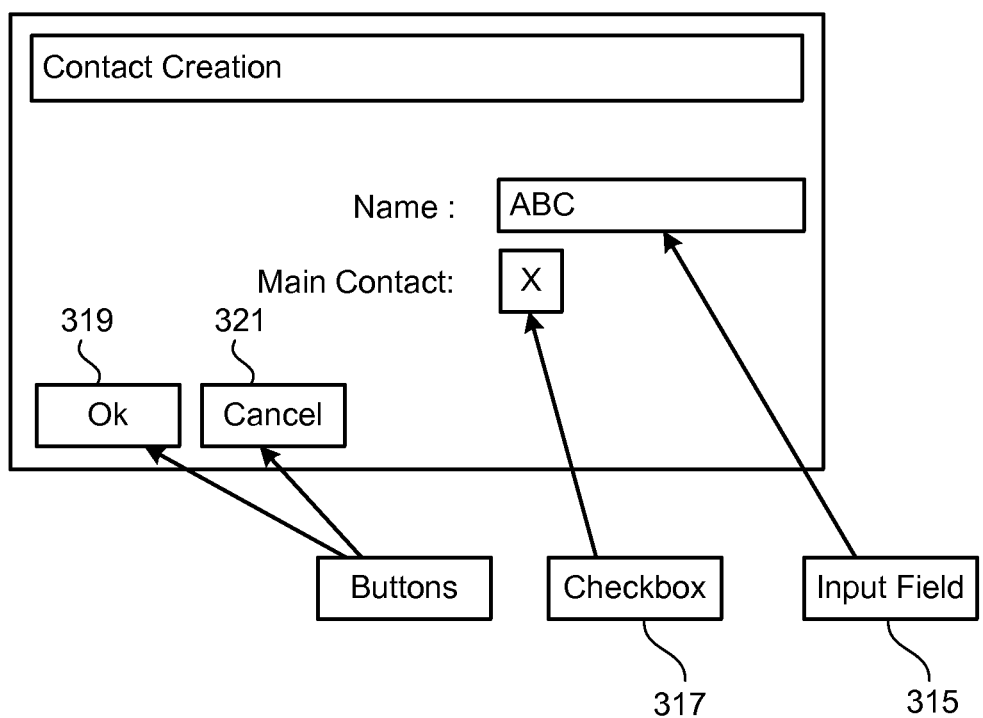
FIG. 3 is an exemplary screenshot of a user interface with user interface elements of a target application.

Referring to FIG. 3, an exemplary screenshot 300 illustrates a user interface with user interface elements of a target application. For example, the screenshot 300 may represent a target application user interface 84 of FIG. 1 and the elements in the screenshot 300 may correspond to user interface elements 82 on the target application user interface 84. While there may not be a one to one correspondence, the elements in the screenshot 300 may be examples of the type of user interface elements 82 that may be interacted with by a user where the interactions are recorded using the test module 100 and the test recorder 110. This exemplary webpage includes an input field 315, a check box 317, an "OK" button 319 and a "Cancel" button 321. A user may interact with each of these user interface elements including the input field 315, the check box 317, and the buttons 319 and 321.

Figure 4:
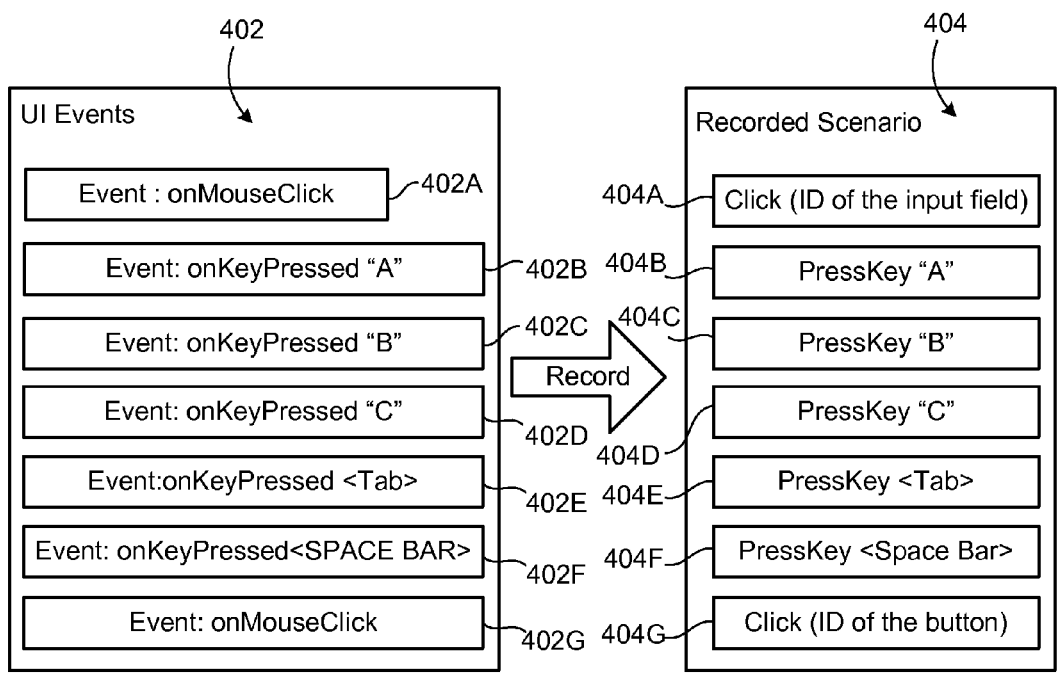
FIG. 4 is an exemplary flow diagram of user interface events that are recorded by the test module without semantics.

Referring also to FIG. 4, an exemplary flow 400 illustrates a user interaction with the exemplary webpage 300 of FIG. 3. Specifically, the process flow 400 illustrates recording UI events related to the input field 315, the check box 317 and a selection of the button 319. The flow 400 illustrates a scenario (e.g., business scenario) in which the test module 100 only reacts on low-level events (e.g., events related to filling out a form) and does not understand the nature of the UI elements that are being manipulated by the user. In this example, the resulting recorded scenario typically contains one entry per event.

For example, each UI event 402 corresponds to an entry in the recorded scenario 404. For instance, an event with a mouse click 402A corresponds to a click (or selection) of the input field 315 which is recorded as a recorded event 404A. The tester may enter characters into the input field (e.g., ABC) which may correspond to the user interaction events 402B, 402C and 402D. The user interaction events 402B-402D may correspond to recorded entries of pressing the A key 404B, pressing the B key 404C and pressing the C key 404D. Next, the user may set the focus on the check box by pressing a tab key. The UI event for pressing the tab key 402E may be recorded as a recorded scenario entry 404E. The spacebar may be selected 402F to select the check box and may correspond to a recorded scenario entry for pressing the spacebar 404F. Finally, the button 319 may be selected by a mouse click UI event 402G and may be recorded as a click 404G.

The simple example of a tester's interaction with the user interface elements illustrated on the screenshot 300 and recording of a business scenario process 400 illustrates a lack of semantics that are associated with the recorded scenario entries 404A-404G. From a test engineer perspective, the recorded scenario 404 does not match the actions that have been done while recording. The test engineer would expect to only see the steps that are relevant to a test automation process. In other words, several actions should be grouped together in a single and comprehensive step. For instance, it may make more sense to group together the actions made for setting the value of the input field 315 instead of relying on raw keyboard events. It also may make sense to get rid of actions that are only performed to set the focus to a different UI element. Also, it may be desirable to detect a UI element type (e.g., input field, checkbox or button) and record something meaningful for later use and understanding by the test engineers. Generic actions such as, "click" may be confusing and may increase the effort required to maintain generated tests that are based on the recorded scenario. It may be more useful and meaningful to record the same business scenario taking into account the semantics.

Figure 5:
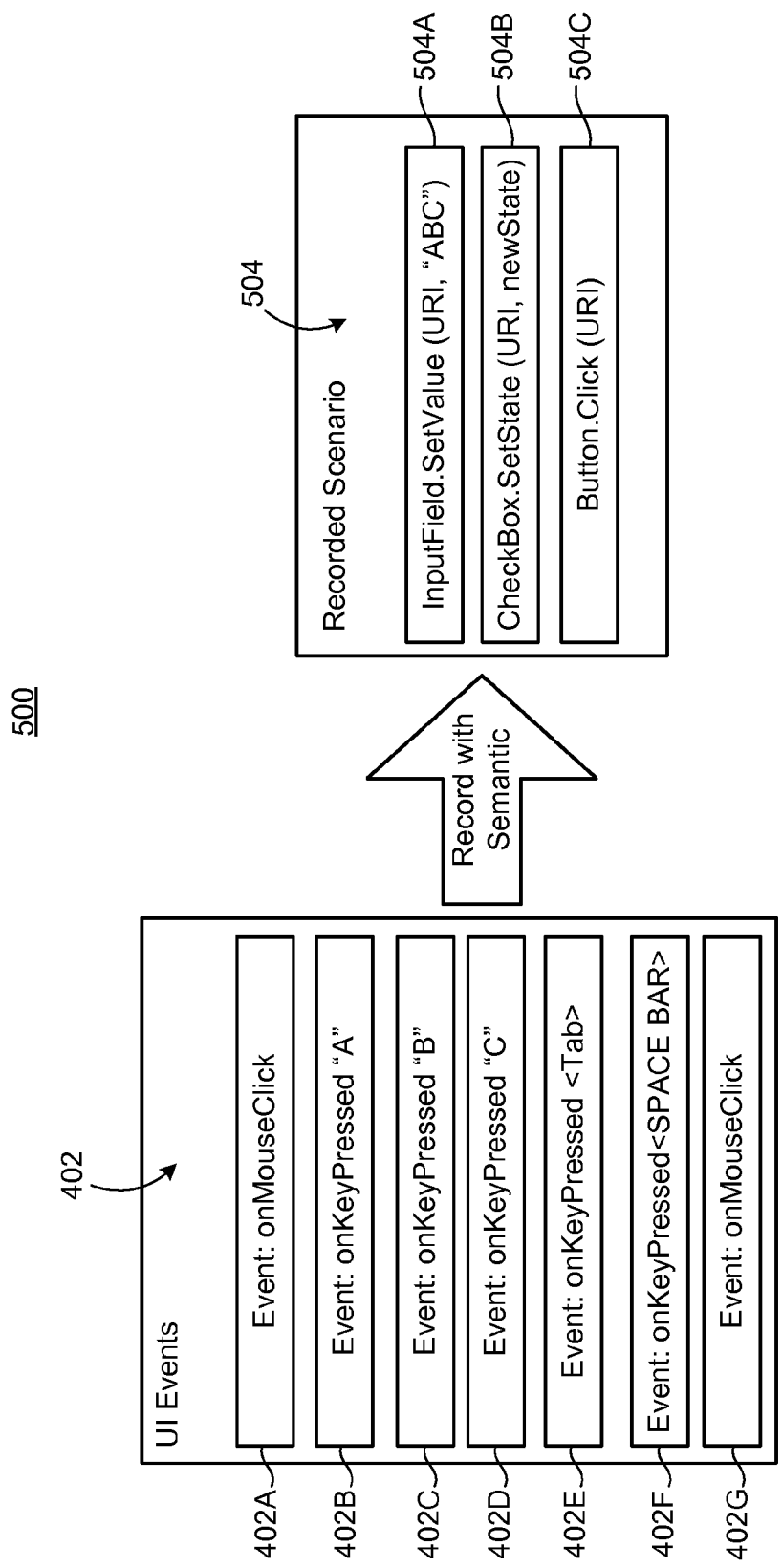
FIG. 5 is an exemplary flow diagram of user interface events that are recorded by the test module in a compact format with semantics.

Referring to FIG. 5, an exemplary flow diagram 500 illustrates recording the same scenario and the same user interface events as in the example flow of 400 but this time recording the user interface events and storing them as recorded entries with semantics. In the exemplary flow diagram 500 of FIG. 5, the same UI events 402 with the events 402A-402G are recorded, for example, by the test module 100 and test recorder 110. However, in this example flow diagram 500, the user interface events 402A-402G are recorded as entries with semantics. The recorded scenario 504 is shorter and includes three recorded entries 504A-504C.

Although the recorded scenario 504 is shorter, the entries 504A-504C are more comprehensive. The first mouse click user interface event 402A has been removed because the action of giving the focus to the input field 315 may be implicit. The keyboard events 402B-402D have been grouped together and recorded in a single step that is now responsible for setting the value 504A. The keyboard action made against the check box 402F has been recorded as an action changing the state of the element 504B. The keyboard event to put the focus of the check box 402E has been removed. The last mouse click was performed against a button 319. Such a click does not only give focus to the button element but it also triggers the corresponding action. The user interface event 402G is recorded as a button click 504C.

Each of the recorded scenario entries 504A-504C also may include other information valuable to the tester for generating a future test scenario for playback against a target application. For example, each recorded entry 504A-504C may include a uniform resource identifier (URI). The URI may be a unique identifier that is used to identify the specific user interface element that was selected during the recording of the user interaction events 402. Each of the recorded entries 504A-504C also may include other information related to the selection and user interface events. For example, recorded entry 504A includes its URI and the value that was input into the input field. The check box recorded entry 504B includes its URI and an indication that a change of state occurred by the inserting of the new state. The URI and other information recorded and stored with the recorded scenario 504 may be used when generating the test scenarios and when played back in automated testing of other target applications.

The test recorder 110 of FIG. 1 may be configured to record user interface events as recorded entries in a recorded scenario and understand and include relevant semantics associated with each recorded entry. For example, the test recorder 110 may be configured to collect information to identify the UI element and information representing the actual state and/or value of the UI element. The test recorder 110 may be configured to collect the values of one or more HTML attributes. For instance, each HTML element may have an ID attribute but this ID attribute may not be sufficient to identify the element in the UI hierarchy. In that situation, the test recorder 110 may collect additional attributes to be able to identify the UI element. The test recorder 110 may be flexible and not restricted to common HTML pages and may be able to record events from complex constructions of HTML pages using one or more different UI technologies. For example, complex HTML pages may include a tree container with a list of clickable "Anchor" elements (i.e., the <A> HTML tag), where each of the trial nodes of the tree can be expanded or collapsed depending on their current state. This example illustrates the need to collect the "state" collapsed/expanded.

Figure 6:
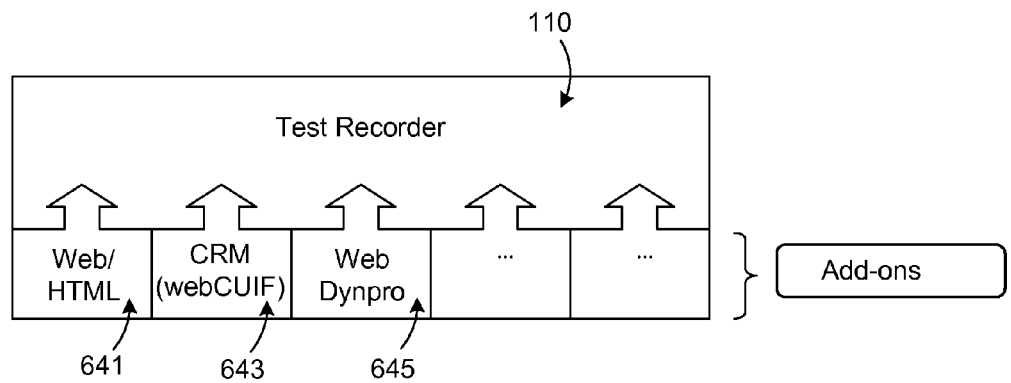
FIG. 6 is an exemplary block diagram of a test recorder with exemplary plug-in technology modules.

Referring to FIG. 6, the test recorder 100 is illustrated with a number of test recorder add-ons. Each recorder add-on may be specific to a certain UI technology and that may understand specific UI events as they are being recorded. In one exemplary implementation, each of the test recorder add-ons may be implemented as a dedicated DLL library that the test recorder module 110 discovers and loads dynamically at runtime, as needed. Each of the add-ons may include a test recorder hook that is part of the test recorder hooks 120 of FIG. 1 and elements listeners that are part of the element listeners 130 of FIG. 1, which provide dedicated listeners to record user interactions with specific user interface elements.

The test recorder add-ons may include a web/HTML add-on 641, a CRM (webCUIF) add-on 643 and a webDynpro add-on 645. While each of the different UI technologies may be used to generate and display HTML content, each of the technologies may render the content in a different manner. For example, a button such as button 319 of FIG. 3 may be coded in one way using standard web technology and may be coded in a different way using a different framework such as webCUIF.

The web/HTML add-on 641 may be responsible for handling the recording of UI events from regular HTML webpages. The other add-ons such as, for example, the CRM add-on 643 and the webDynpro add-on 645 may be used to record user interactions with user interface elements that were developed using those respective technologies. For example, the CRM add-on 643 may be responsible for handling UI technologies specific to SAP CRM applications. The webDynpro add-on 645 may be used to record user interaction events for SAP business applications built on top of the webDynpro framework. The add-ons illustrated in FIG. 6 are not meant to limit the scope of this document and are provided as exemplary implementations. Other add-ons specific to other UI framework technologies are also within the scope of this document.

Figure 7:
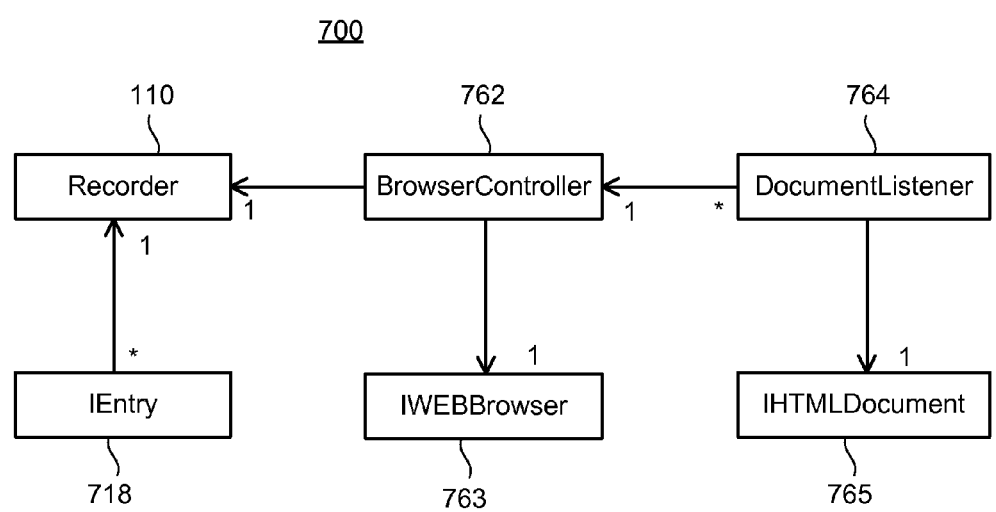
FIG. 7 is an exemplary class diagram that illustrates classes that are related to recording test scenarios.

Referring to FIG. 7, an exemplary class diagram 700 illustrates the classes associated with the test recorder 110 for recording user interactions with a target application. In this example, the target application may be implemented using a browser application and a browser application interface and the recorder 110 may record a web-based scenario. The browser application may include one or more user interface elements on the target application user interface. The particular application that may be instantiated in the web browser may be any type of application. The browser application may be any type of browser including Microsoft Internet Explorer, Google Chrome, Mozilla Firefox or other types of browser applications. While the classes described below may be associated with Microsoft and Internet Explorer, other types of similar and corresponding classes may be used and part of the test recorder module 110.

The class diagram 700 illustrates the test recorder 110 and example recorder interfaces (e.g., recorder interface 114 of FIG. 1) including document level interfaces (e.g., document level interface 116 of FIG. 1) and an entry interface (e.g., entry interface 118 of FIG. 1). The recorder 110 may keep the list of the recorded entries as they are being recorded into a recorded scenario and recorded scenario. Typically, there may be at least one entry per action performed by the user while recording the scenario. The test recorder 110 may interface with the test module user interface (e.g., test module user interface 90 of FIG. 1).

In this example, the document level interfaces may include a browser controller interface 762 and a document listener interface 764. The entry interface may include an IEntry interface 718. The objects implementing the IEntry interface 718 may maintain references to the information which may be used to play the action again at runtime as part of a generated test scenario.

When the recording activity is started, the test recorder 100 creates a new session of the browser (e.g., Internet Explorer browser) and registers itself to native events exposed by different interfaces associated with the browser and the target application. The browser controller interface 762 may be an interface that is listening for events sent by the browser application. The browser controller interface 762 may keep a reference to the IWebBrowser interface 763 that is exposed by one of the browser interfaces. The IWebBrowser interface 763 may expose information related to various user interactions and user events. The document listener interface 764 may be the one listening for events sent from HTML documents that the web browser may display. The document listener 764 may keep a reference to the IHTMLDocument interface 765 that is exposed by the MSHTML COM interface exposed by the COM interface exposed by the browser.

In one exemplary implementation, there may be one document listener object per HTML document displayed in a webpage. In other words, if the webpage relies on page composition (using FRAME or IFRAME containers), each document (including the main one) may be associated with its own document listener instance. The document listener instance may get informed when the user performs actions against the UI elements that the HTML document displays. The test recorder 110 may rely on the on-focus in and on-focus out events to detect which UI element is being manipulated by the user.

Figure 8:
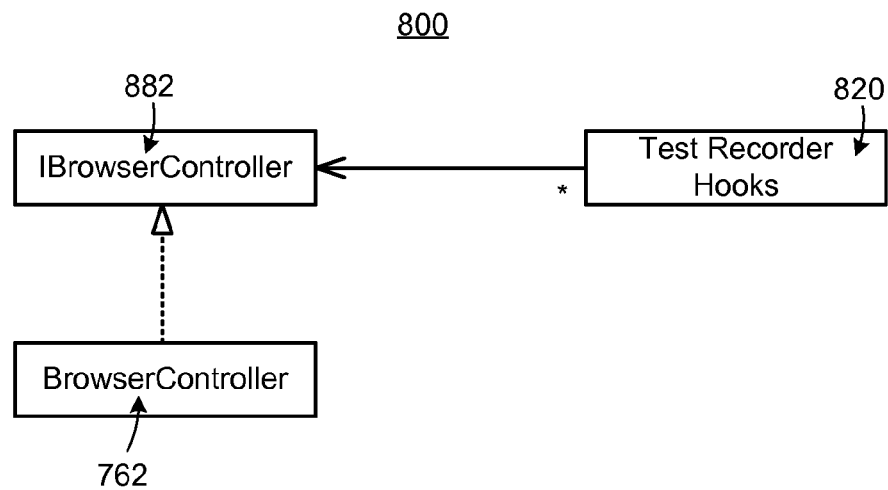
FIG. 8 is an exemplary class diagram that illustrates the browser controller class diagram.

Referring to FIG. 8, an exemplary class diagram 800 illustrates a browser controller class diagram. The browser controller 762 interface may interface with an IBrowserController interface 882. The IBrowserController interface 882 may expose an event that is generated by the browser controller instance 762 when it does not know where else to designate the event. The browser controller class diagram 800 also includes the test recorder hooks class 820. Any classes may register to the IBrowser controller events to perform some additional operations. The test recorder hooks 120 of FIG. 1 may include multiple hook classes that are configured to observe each instance of the browser controller class 762. The test recorder hooks may include multiple different hook classes 820 that are configured to generate a request for an element listener. Each of the test recorder hooks may be associated with a specific UI technology (a specific UI format) where each hook 820 may include multiple different element listeners depending on a type of selected UI element. One test recorder hook 820 also may include a default hook for handling regular webpages.

Figure 9:
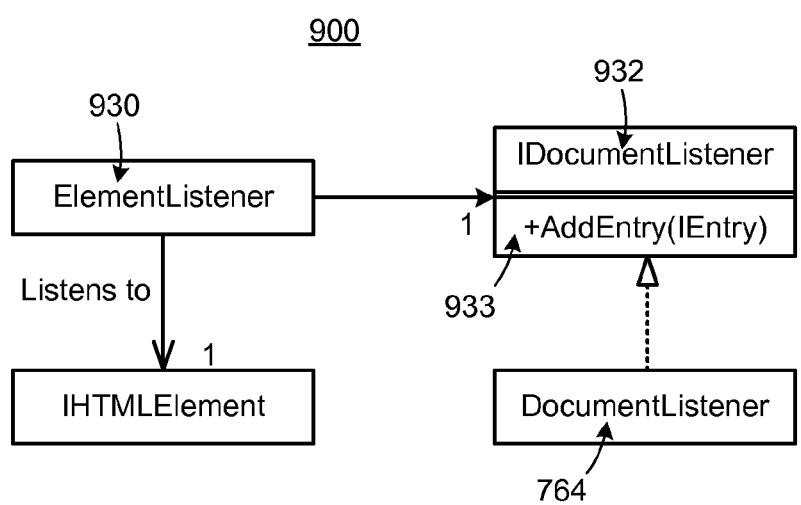
FIG. 9 is an exemplary class diagram that illustrates the element listener class diagram.

Referring to FIG. 9, an exemplary class diagram 900 illustrates the element listener class diagram. There may be multiple instances created for each of the element listener classes. A new element listener instance may be created each time a UI element gets the focus. The previous instance (if any) may be released before creating the new one. The element listener class 930 may be responsible for handling all events that are relevant to test automation. The element listener 930 may keep a reference to an IDocument listener instance 932 providing additional information about the current context and an add entry 933 method to populate the recorded scenario.

For example, the element listener class 930 receives a user interface interaction such as, the selection of a UI element. The element listener may receive the event and collect information about the UI element such as, for example, the URI of the element and its current state. The element listener 930 may create an IEntry instance using the IEntry interface 933 and encapsulate the collected information. The IEntry interface 933 collects and encapsulates the event information and adds this object to the recorded scenario such as, recorded scenario 10 using the add entry method of the document listener 964. The actions performed by the user are recorded as an IEntry instance.

Each of the add-ons to the test recorder 110 such as, for example, add-ons 641, 643 and 645, may have different implementations of the IEntry instance interface. The recorded entries that are stored in the recorded scenario storage 150 may be read back later in order to generate test components for a test scenario. The entries expose public properties providing the information that may be needed at runtime to perform the action again. Such information that is recorded may include an identification of the UI element (e.g., the URI), the name of the test component to use at runtime and the value of the input parameters depending on the element nature.

Figure 10:
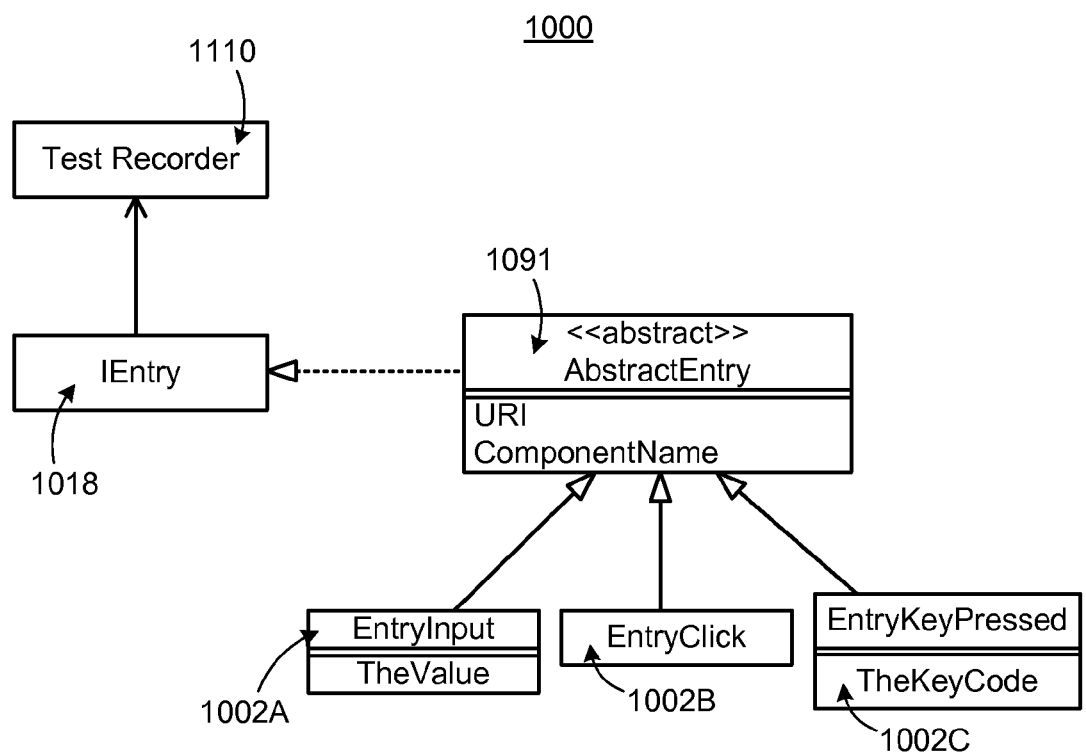
FIG. 10 is an exemplary class diagram that illustrates the IEntry class diagram.

Referring to FIG. 10, an exemplary class diagram 1000 illustrates the IEntry class diagram and the IEntry interface 1018. Each of the test recorder add-ons may implement the classes and the interfaces in a different manner. The class diagram 1000 illustrates how the web recorder add-on 641 may implement the IEntry interface.

In this exemplary implementation, the entries may be extending from an abstract entry class 1091 where common logic may be encapsulated. For example, the user interactions 1002A, 1002B and 1002C may delegate to abstract entry class 1091 for collecting the information which identifies the UI element.

The element listeners (also referred to as event listeners) may be responsible for collecting all the information required to be able to play the action again during a later test execution. The information that may be desired for collection is to find a way to make sure that the test player will be able to find it at runtime. Although not illustrated in FIG. 1, the test player may be a component of the test module 100. Identifying a UI element may be complex especially when the application relies on page composition or when the UI framework does not generate an HTML attribute providing a unique ID. In that situation, the player may solve the issue of identifying the UI elements using URIs. The identification of a UI element and its URI is described in co-pending U.S. patent application Ser. No. 13/328,735, filed on the same date herewith and titled "Systems and Methods for Identifying User Interface (UI) Elements," herein incorporated by reference in its entirety.

In practice, several HTML attributes are properties such as, for example, the HTML tag name, the class attribute, etc., may be collected and encapsulated into IEntry instances using the IEntry interface 1018. The IHTMLElement interface and the interfaces extending it may be used to collect common HTML attributes. The IDocumentListener, an IDomInformation interface may be used to collect information about the parent container such as, FRAME or IFRAME. The IEntry interface 1018 may have the ability to group together the collected information and generate a URI compliant with a player that is capable of playing the recorded test scenario back.

Referring to FIG. 11, an example code snippet 1100 illustrates an example of how an entry exposes public properties providing the value of each input parameter. The code snippet 1100 is an example of one entry instance that captures the public properties and the additional properties that match the input parameter names.

Figure 12:
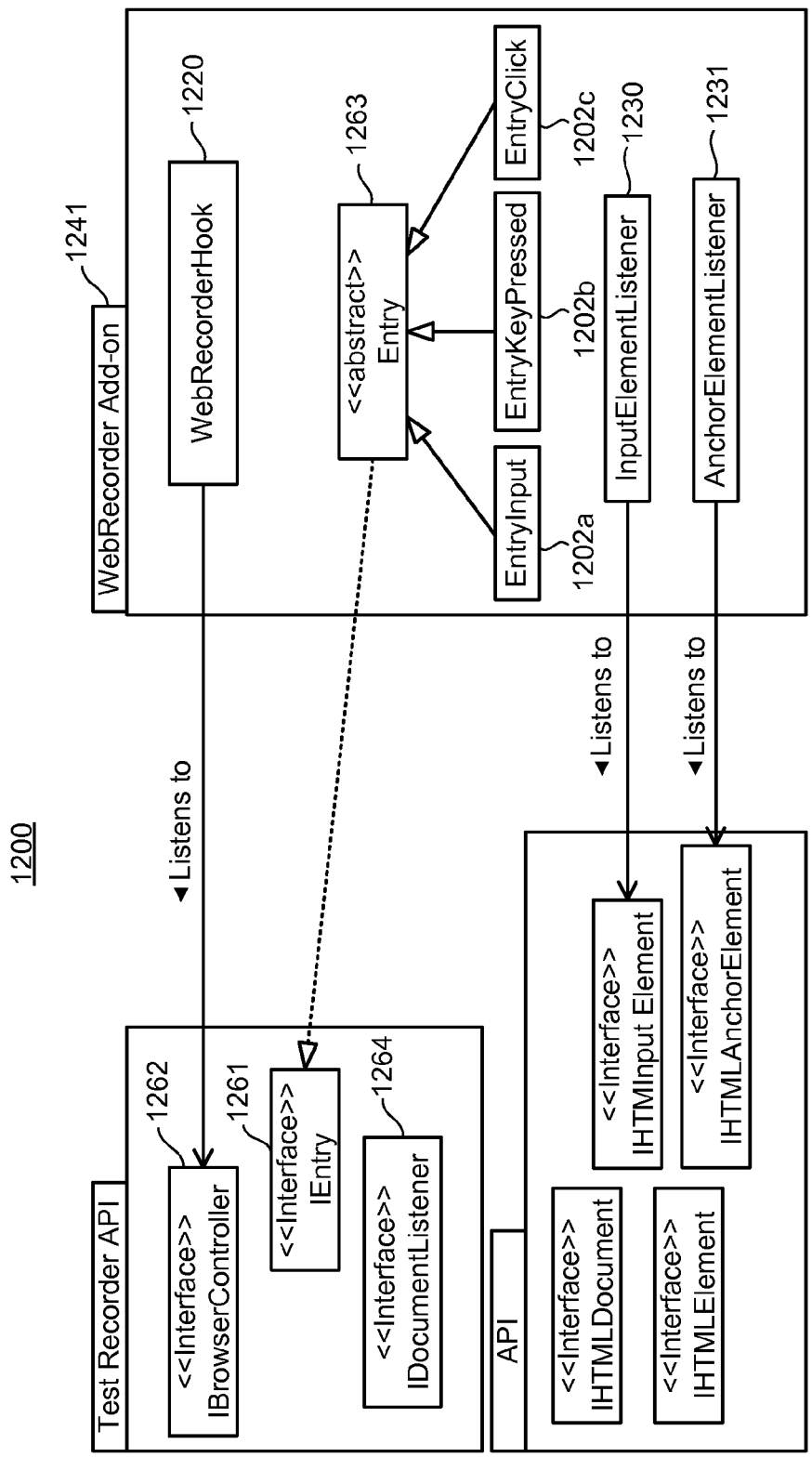
FIG. 12 is an exemplary class diagram that illustrates web recorder add-on dependencies.

Referring to FIG. 12, a class diagram 1200 illustrates an overview of the web recorder add-on and its related dependencies. The class diagram 1200 illustrates an overview of classes that the add-on provides and the dependencies to both the test recorder 110 as well as any browser-related API. For example, if the browser in use is the Internet Explorer, than the browser API may be related to the Internet Explorer API that exposes one or more interfaces to enable the test recorder 110 and the appropriate add-on to record entries of user interactions through the Internet Explorer browser. In the example class diagram 1200, the web recorder add-on includes a web recorder hook 1220 that is configured to listen to the IBrowserController interface. The test recorder API includes the IBrowserController interface 1262, the IEntry interface 1261 and the IDocumentListener interface 1264.

The web recorder add-on 1241 includes the web recorder hook 1220 which includes multiple element listeners. The element listeners include an input element listener 1230 and an anchor element listener 1231. The input element listener 1230 is configured to capture information exposed by the IHTMLElement in the browser API. The anchor element listener 1231 is configured to capture inputs with user interactions that are exposed through the IHTMLElement interface. The web recorder add-on 1241 captures user interactions through the input element listener 1230 and the anchor element listener 1231.

For example, user interactions that include entry inputs 1202A, entry keys pressed 1202B and entry clicks 1202C may be captured by the web recorder add-on 1241 through the Entry abstract class 1263. The test recorder API listens to the web recorder add-on and captures the inputs to the web recorder through the web recorder hook 1220. The test recorder API for the general webpage inputs are the entered as recorder entries and stored in a recorded scenario in recorded scenario storage.

Figure 13:
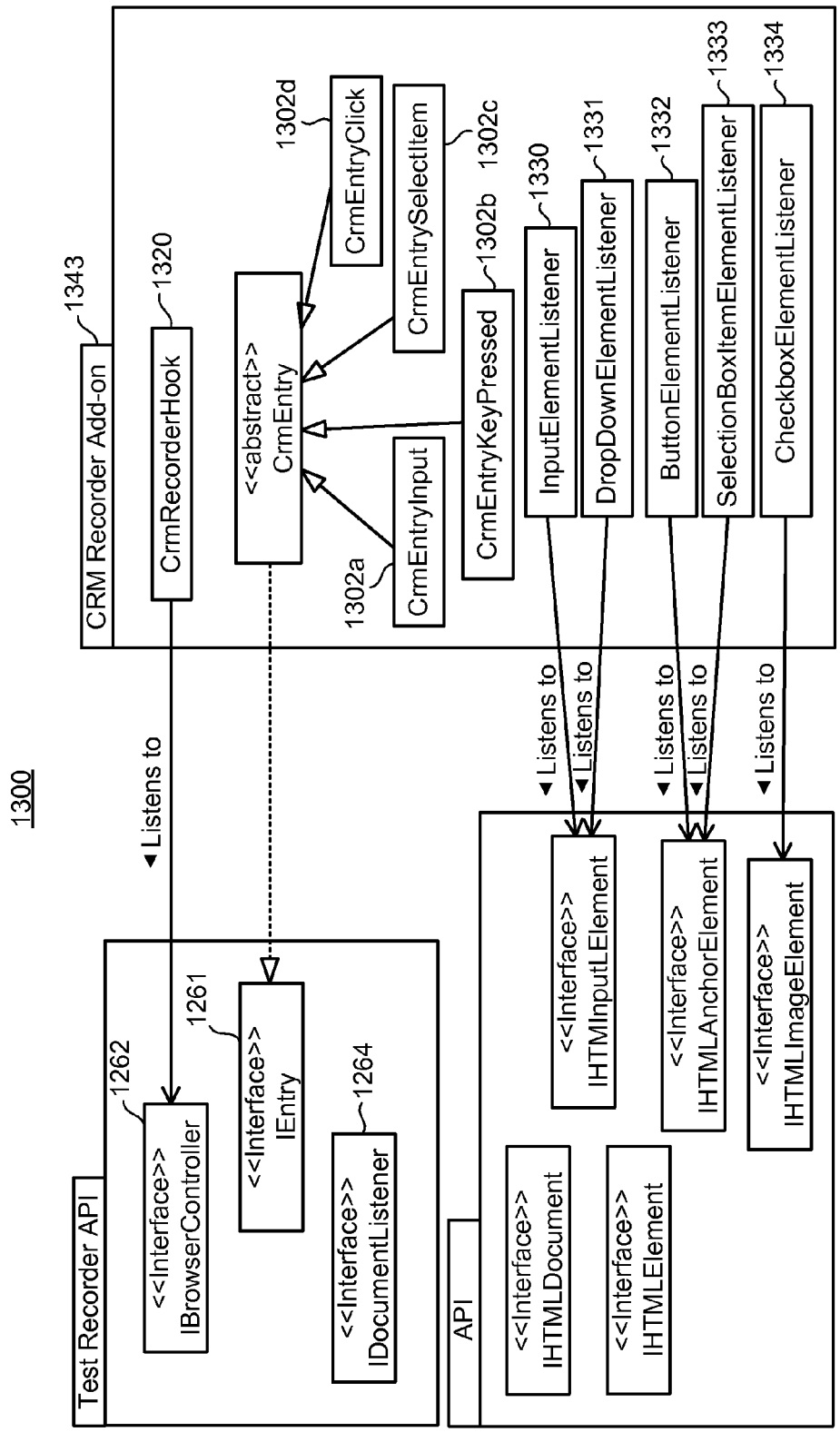
FIG. 13 is an exemplary class diagram that illustrates CRM add-on dependencies.

Referring to FIG. 13, an exemplary recorder add-on is illustrated showing the connections between the test recorder API and the CRM recorder add-on. The CRM recorder add-on may be the same as the CRM add-on 643 of FIG. 6. Similar to the web recorder add-on 1241, the CRM recorder add-on 1343 may include a CRM recorder hook 1320 that is specific to the UI technology for HTML pages developed with the CRM technology format. The CRM recorder hook 1320 may include multiple event (or element) listeners. The recorder hook 1320 may include an input element listener 1330, a drop-down element listener 1331, a button element listener 1332, a selection box item element listener 1333 and a check box element listener 1334. The different listeners 1330-1334 are configured to listen to interfaces exposed by the browser API including, for example, the IHTML input element, the IHTML anchor element and IHTML image element.

For example, the input element listener 1330 and the drop-down element listener 1331 listen to and record information exposed by the IHTML input element. The button element listener 1332 and the selection box item element listener 1333 record user interactions exposed through the IHTML anchor element interface. The check box element listener 1334 records user interactions exposed through the IHTML image element interface. The entry instances such as, CRM entry inputs 1302A, CRM entry key press 1302B, CRM entry selection item 1302C and CRM entry clicks 1302D are all created by the CRM recorder add-on 1343.

Figure 14:
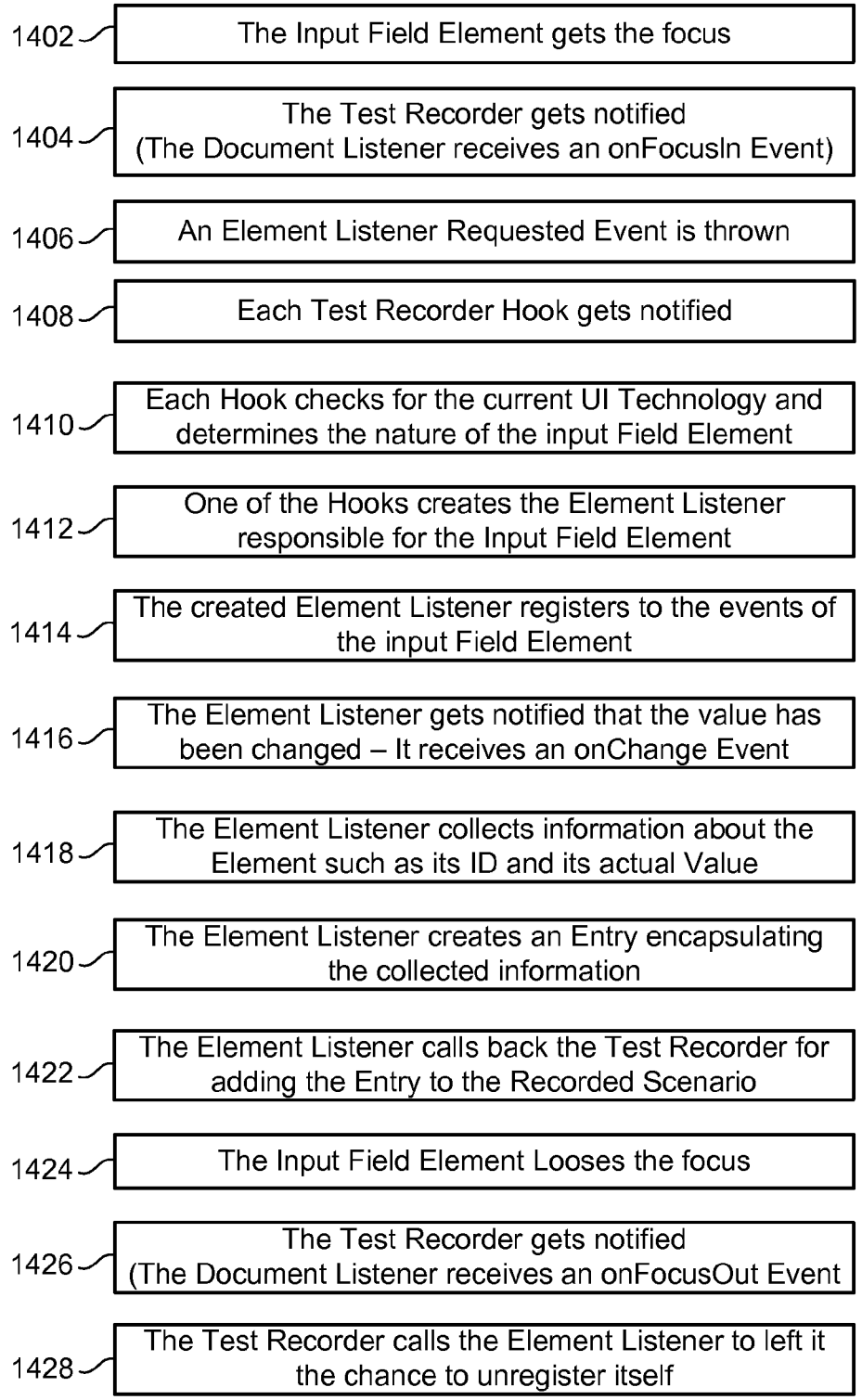
FIG. 14 is an exemplary flow diagram that illustrates a process for recording user actions.

Referring to FIG. 14, an exemplary flow diagram 1400 illustrates a flow of recording user interactions in a CRM user interface application framework. Process 1400 starts with an input field element getting the focus (1402). The test recorder gets notified (1404). For example, the element listener or the document listener receives an on focus-in event. The element listener requested event is thrown (1406). Each of the test recorder hooks gets notified that a user interface element has received focus (1408). For example, each of the multiple different test recorder hooks 120 of FIG. 1 are notified of a user interaction element receiving the focus by a user interaction.

Each test recorder hook checks for the current user UI technology and determines the nature of the input field element (1410). One of the hooks creates the element listener responsible for the input field element (1412). For example, the hook responsible for the particular UI technology associated with the selected input field element instantiates an element listener for the particular input field element.

The created element listener registers to the events of the input field element (1414). The element listener is notified that the value has been changed (1416). For example, the element listener may receive notification of an on change event. The element listener collects information about the element such as its URI and its actual value (1418). The element listener creates an entry encapsulating the collected information (1420). The element listener then calls back to the test recorder to add the entry to the recorded scenario (1422). The input field element loses focus (1424). For example, a user may select a different user interface element causing the input field element to lose its focus. The test recorder is notified (1426). That is, the document listener receives an on focus-out event. The test recorder calls the element listener to allow the element listener a chance to unregister itself (1428).

Figure 15:
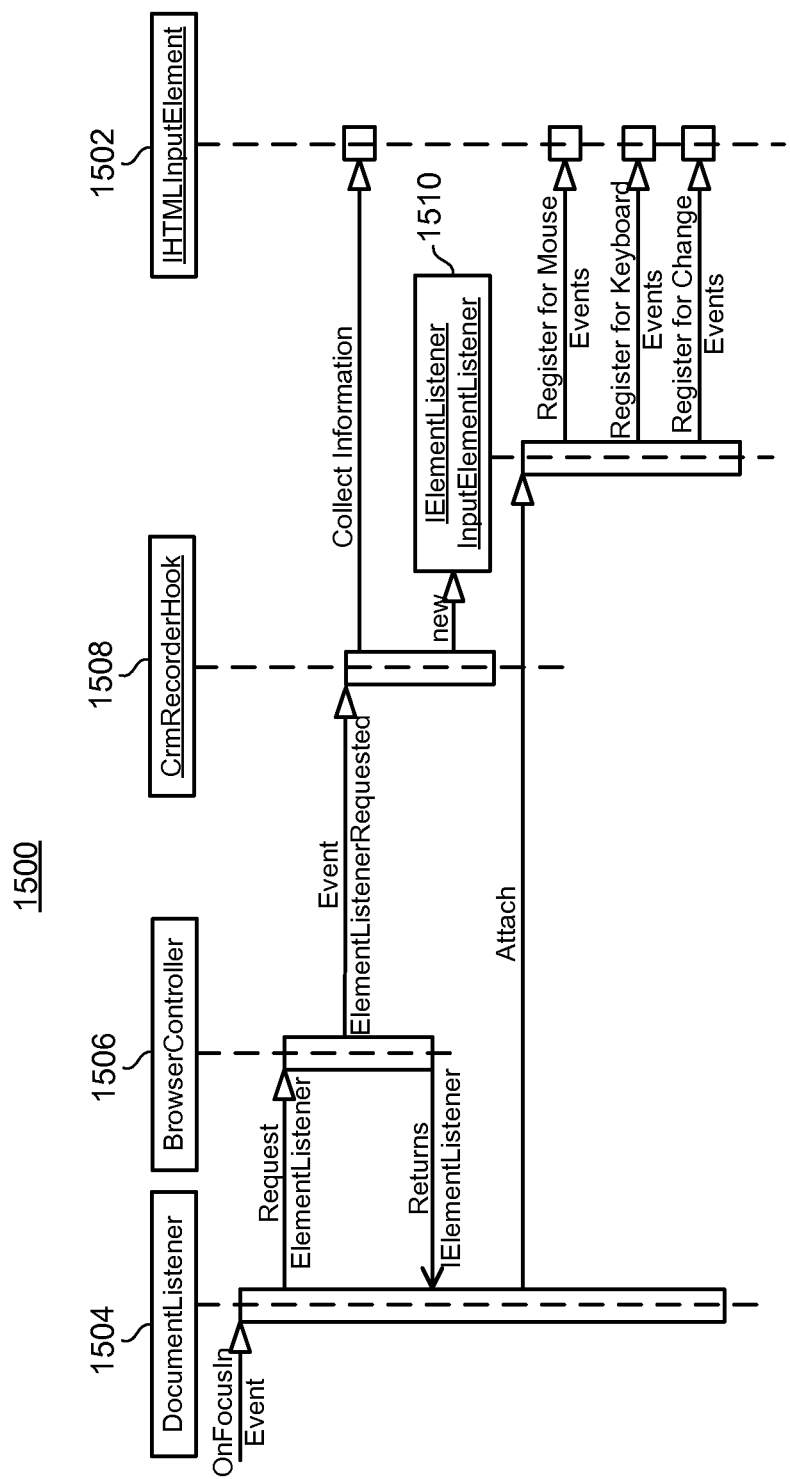
FIG. 15 is an exemplary sequence diagram that illustrates the element listener instances creation.

Referring to FIG. 15, and exemplary sequence diagram 1500 illustrates a sequence of how an element listener instance is created. The flow or sequence diagram 1500 illustrates the process for an element listener registration. The IHTMLInputElement instance 1502 represents the INPUT element that is receiving the focus. The sequence starts with an on focus event that provides a reference to the IHTML input instance. The document listener 1504 delegates to the browser controller 1506 using the RequestElementLstener method. The browser controller 1506 iterates through the list of registered test recorder hooks and sends the ElementListenerRequested event until one of the test recorder hooks returns a concrete element listener. In this exemplary implementation of FIG. 15, only the CRM recorder hook 1508 is illustrated even though there may be multiple different test recorder hooks to which the browser controller sends the element listener requested event.

As described above, all test recorder hooks that are registered may receive the event but only the test recorder hook responsible for the particular UI technology associated with the on focus UI element responds to the request. The CRM recorder hook 1508 collects information about the current HTML element to determine its nature. If the UI element does not match the UI technology of the current test recorder hook, the flow is interrupted and the event delegate returns a null. Otherwise, the test recorder hook creates the appropriate element listener instance based on the collected information. In this example, the CRM recorder hook 1508 returns the instance of the newly created element listener to the caller. The document listener 1504 keeps a reference of the newly created element listener 1510 and invokes its attach method to give it the chance to register itself as listener for events that are relevant to a test automation scenario. For example, the IElement listener 1510 registers for mouse events, keyboard events, and change events.

Figure 16:
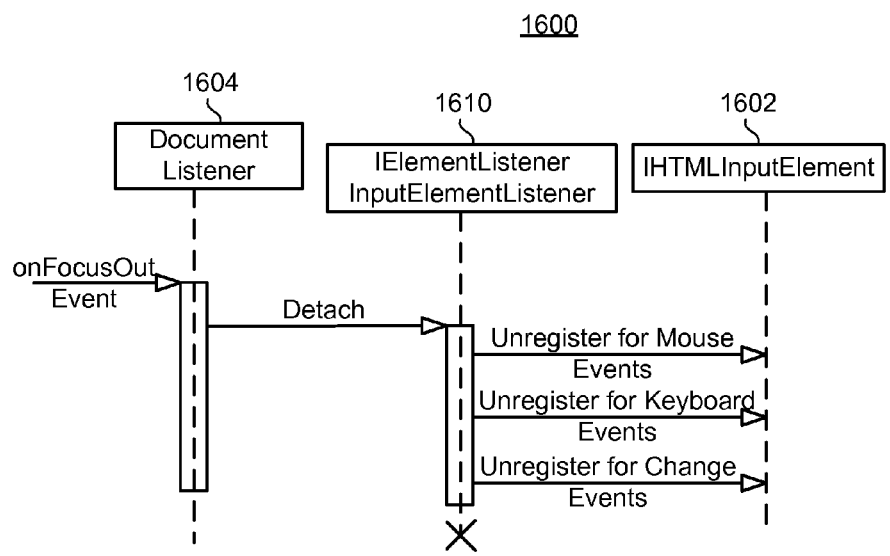
FIG. 16 is an exemplary sequence diagram that illustrates the element listener un-registration.

Referring to FIG. 16, an exemplary sequence diagram 1600 illustrates how element listeners may be released when an on focus-out event is received. In this example, in this sequence diagram 1600, the document listener 1604 receives an on focus-out event. The IHTML input element 1602 for example, may be released from the focus of the user when a user selects a different user interface element. The document listener 1604 may invoke a detach method of the element listener instance 1610 to allow the element listener instance to unregister itself from further event notifications. For example, the element listener instance 1610 may unregister from mouse events, unregister for keyboard events and unregister for change events. After the detach method has been invoked and the element listener instance 1610 unregisters for event notifications, then further events will not be recorded by this particular element listener instance.

Figure 17:
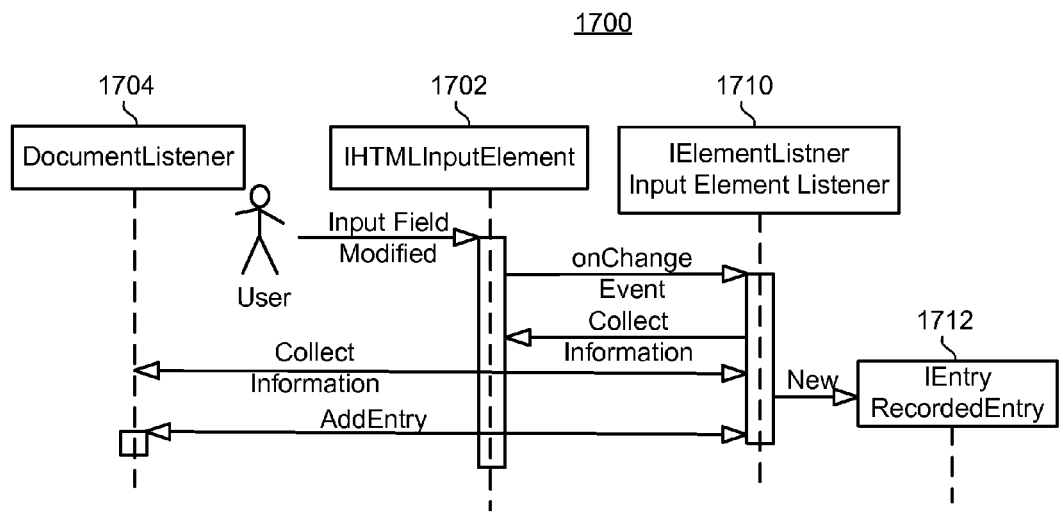
FIG. 17 is an exemplary sequence diagram that illustrates the IEntry instance creation flow.

Referring to FIG. 17, an exemplary sequence diagram 1700 illustrates how the element listener instance intercepts events and adds them as IEntry instances to the recorded scenario using the Ientry interface. For example, the user may change the value of an input field and interact with the IHTMLInputElement 1702. The input field is modified by the user through the interaction with the IHTMLInputElement 1702. The element listener instance such as, for example, the element listener instance 1710 created when the HTMLInputElement received the focus (gets notified and receives the on change event). Since the element listener instance 1710 is specific to a particular UI technology, the element listener instance knows which information is required to perform and repeat the same operation that may be played as part of a test scenario. The element listener 1710 collects this information using the methods of both the IHTMLInputElement and the IDocumentListener interfaces. The element listener 1710 creates an IEntry instance 1712 where the collected information is encapsulated. The IEntry instance 1712 is added to the recorded scenario by calling the IEntry method of the IDocumentListener instance. The document listener 1704 records the information as a recorded scenario and stores it in the recorded scenario storage.

The IBrowserController interface defines the event core layer exposes to the test recorder add-ons, as shown in Code Snippet 1 below.

---

Code Snippet 1

```
public delegate IElementListener ElementListenerRequestedHandler
        (IDocumentListener documentListener, IHTMLElement
        srcElement);
public interface IBrowserController
    {
        event ElementListenerRequestedHandler
        ElementListenerRequested;
    }
```

---

The IBrowserController and the ElementListenerRequested event is the one thrown by the browser controller when a UI element gets the focus. Each test recorder hook listens to this event to handle the situations that are specific to its UI technology. The test recorder hook typically collects information from the current context using the event parameters and creates the appropriate IElementListener instance when the parameter refers to a UI element that it can handle. For example, the test recorder hook creates an appropriate IElementListener instance when the source element parameter refers to a UI element that it can handle. The IDocumentListener instance provides additional information about the current context. The IHTMLElement is a reference to the UI element that receives the focus. The return value of the IElementListener instance.

The IDocumentListener interface provides additional information to the test recorder hook to allow the test recorder hook to create the concrete element listener instances, as shown in Code Snippet 2 below.

Code Snippet 2

```
public interface IDocumentListener
{
    IHTMLDocument Document { get; }
    IDomInformation DomInformation { get; }
    void AddEntry(IEntry entry);
}
```

The Document property provides a reference to the HTML document as exposed by a specific browser API. If the webpage relies on page composition (using FRAME or IFRAME elements), the reference points to the HTML document of the frame containing the UI element getting the focus. The DOMInformation property provides information about the HTML DOM (Document Object Model) hierarchy to make it easier to collect information about the current page composition. The AddEntry method is the one called by the element listener instances when a UI event is recorded and converted into an IEntry instance. The document listener is responsible for adding a new entry to the recorded scenario storage. The IEntry provides a reference to the entry that has been created by the element listener.

The IDomInformation interface provides access to information about the document container, as shown below in Code Snippet 3.

Code Snippet 3

```
public interface IDomInformation
{
    IHTMLElement DocumentContainer { get; }
    IDomInformation Parent { get; }
    int PopupId { get; }
}
```

The one containing the element getting the focus. The purpose of the IDomInformation interface is to make it easier to implement a test recorder add-on by providing a recursive access to the HTML DOM hierarchy. The DocumentContainer property returns a reference to the FRAME or IFRAME element that includes the HTML document. The property may be null when the element getting the focus is part of the main HTML document. The parent property returns a reference to the parent DOM information, if any. This method may be used to recursively traverse up the UI hierarchy. This may be useful when a frame element includes another frame element. The property returns a reference to the IDomInformation instance encapsulating the parent document container, if any. The pop-up ID property is a simple counter that the core layer maintains to inform the test recorder add-on whether the user action has been performed in the main browser window or in a model pop-up dialogue. The property may return the pop-up ID as a value.

The element listeners may perform one or more different methods related to the element listener interface, as shown below in Code Snippet 4.

Code Snippet 4

```
public interface IElementListener
{
    void Attach( );
    void Detach( );
```

Code Snippet 4
-continued

```
    void Highlight( );
}
```

A first method may be the attach method. The attach method may be the one called by the document listener when an HTML element gets the focus. This gives the chance to the element listener instance to register itself for the UI events that are relevant to test automation. The method may not include input parameters because the information required has been provided by the test recorder hook during the creation of the element listener instance.

Another method performed by the element listeners is the detach method. The detach method is the one called by the document listener when an HTML element loses the focus. This provides an opportunity for the element listener instance to unregister itself to avoid receiving further UI events. The detach method may not include any input parameters because the information required has been provided by the test recorder hook during the creation of the element listener instance.

Another method performed by the element listeners is the highlight method. The highlight method may highlight the HTML element for which an element listener has been created. The highlight may provide a visual effect to help testers to see whether the actions performed are properly recorded or not. The highlighting of UI elements may be optional that can be turned on or off as part of a configuration setting. The document listener may invoke this method when the option to highlight is turned on. The IEntry interface is implemented by objects that are added to the recorded scenario, as shown below in Code Snippet 5.

Code Snippet 5

```
public interface IEntry
{
    string ComponentName { get; }
}
```

The IEntry interface provides the logical name of the test component that is to be added to the generated test scenario. The IEntry interface defines the contract and the class implementing this interface includes at least the ComponentName property. Additional properties may be optional, but they provide the actual values of the component parameters. An entry does not keep references to objects having a restricted life-cycle. In this manner, the entry only keeps references having an unrestricted life-cycle thus making it storable in a repository. The entry includes an empty constructer to make sure that the test generation can read it back from the repository. The entry also provides the logical name of the test component responsible for playing back the operation at runtime during the execution of the test. The entry also exposes a public property for each input parameter that the test component expects. Those properties may be used to generate a test out of the recorded scenario. The element listeners may be responsible for collecting all the information required to be able to play the action again during the test execution.

One or more HTML attributes or properties (such as the HTML tag name, the class attribute, etc.) may be collected and encapsulated into IEntry instances. The IHTMLElement interface and the interfaces extending it may be used to collect common HTML attributes. The IDocumentListener and IDOMInformation interface may be used to collect information about the parent container. The IEntry instance includes the ability to group together the collected information and generate a URI compliant with the test player.

Figure 18:
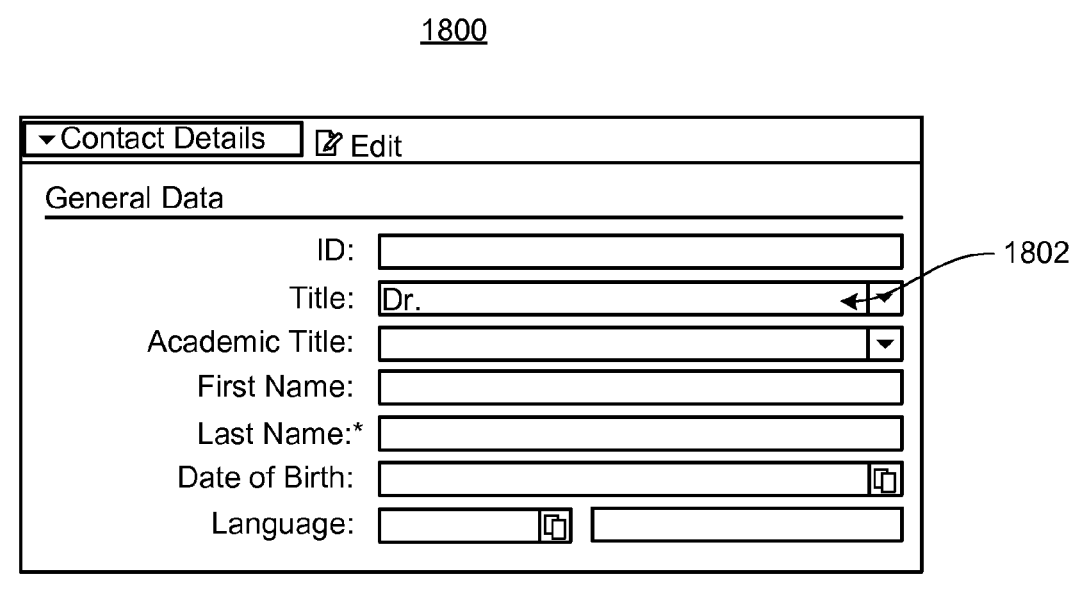

Referring to FIG. 18, an exemplary screenshot 1800 of a CRM application is illustrated. The CRM application may be used to illustrate how the element listeners determine the user interface element nature and convert actions performed by the user into a comprehensive entry in the recorded scenario. In this example, the focus may be on the combo box 1802 where the title of the CRM contact can be specified.

A CRM drop-down list box element may be represented by HTML code. Internet Explorer browser includes a developer tool that may be used to view the HTML content of the webpage. The HTML content may be used to understand the HTML structure generated by the web-CUIF framework. The combo box 1802 of FIG. 18 is a regular input HTML element as indicated by the HTML code line <input class="th-if th-if-icon" id="27_125_V1. The combo box HTML element includes an ID attribute of: C27_W125_V126_V127_V128_header_struct.title_key.

An exemplary code snippet illustrates a CRM drop-down list box element and its meta information: <span class=tao-testmode"id="A_bp_cont:V_contactDetails:T_drpopdown-ListBox:I_header_struct.title_key"style=". The input element is embedded in a span HTML element providing meta information about the combo box. The span element may be easily detected because of its class attribute :tao-testmode. The span element provides meta information about the UI element using a syntax which is specific to the web-CUIF framework. From a web-CUIF perspective, a combo box is a drop-down list box element.

Figure 19:
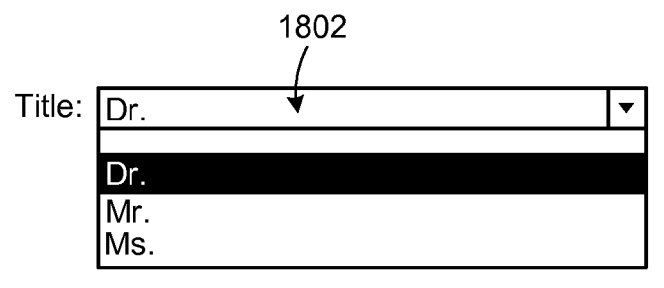

Referring to FIG. 19, an exemplary screenshot of the drop-down menu of the combo box 1802 is illustrated. Within the combo box 1802, a user may select one of the different titles as shown in FIG. 19.

Each item in the drop-down box of FIG. 21 corresponds to an anchor element, i.e., the Anchor (<A>) HTML tag. Each item also includes a parent element providing meta information and each item also includes a key attribute identifying it such as for example: key 0004.

Combo box items may be regular web links meaning that they may be built using anchor HTML elements. A web recorder would in that situation create an anchor element listener instance as soon as an anchor element receives the focus from a user selection. The element listener would then register itself for mouse events and thus receive the mouse click performed by the user when selecting the item. Based on the information it receives and what it can collect from the current context, it will create the appropriate IEntry instance. The entry will, later on, be converted into an occurrence of a test component when generating the test. The result could, for instance, be a call to an anchor/click component with the key attribute as parameter for identifying the anchor element.

The item selection may be recorded using the CRM recorder add-on. The web-CUIF framework adds meta information that is directly available in the HTML DOM hierarchy. The elements surrounding the anchor element provides, using the same syntax then the SPAN element, an ID which contains a lot of data.

The CRM recorder add-on may adapt its behavior by parsing the meta information available. The Element Listener may need to collect several attributes and combine them together to uniquely identify the element in the whole HTML document. Based on this information, the result in a generated test would then be a call to a selection box item select component with the ID of the element as a parameter. From a tester perspective, the generated test includes more semantics. The tester now knows that the action performed is not just a click on a link, but the selection of an item. The CRM recorder add-on and more precisely the element listener instance responsible for the selection box item elements may collect information of both the selection box item and the drop-down list box when receiving the mouse click event. The drop-down list box ID of the combo box is quite similar to the one of the item. The generated test could then be a call to a drop-down list selection item component with two parameters, the first one providing the ID of the drop-down list box and the second one providing the key of the item that is to be selected. In this manner, the drop-down list select item may be played at runtime.

Figure 20:
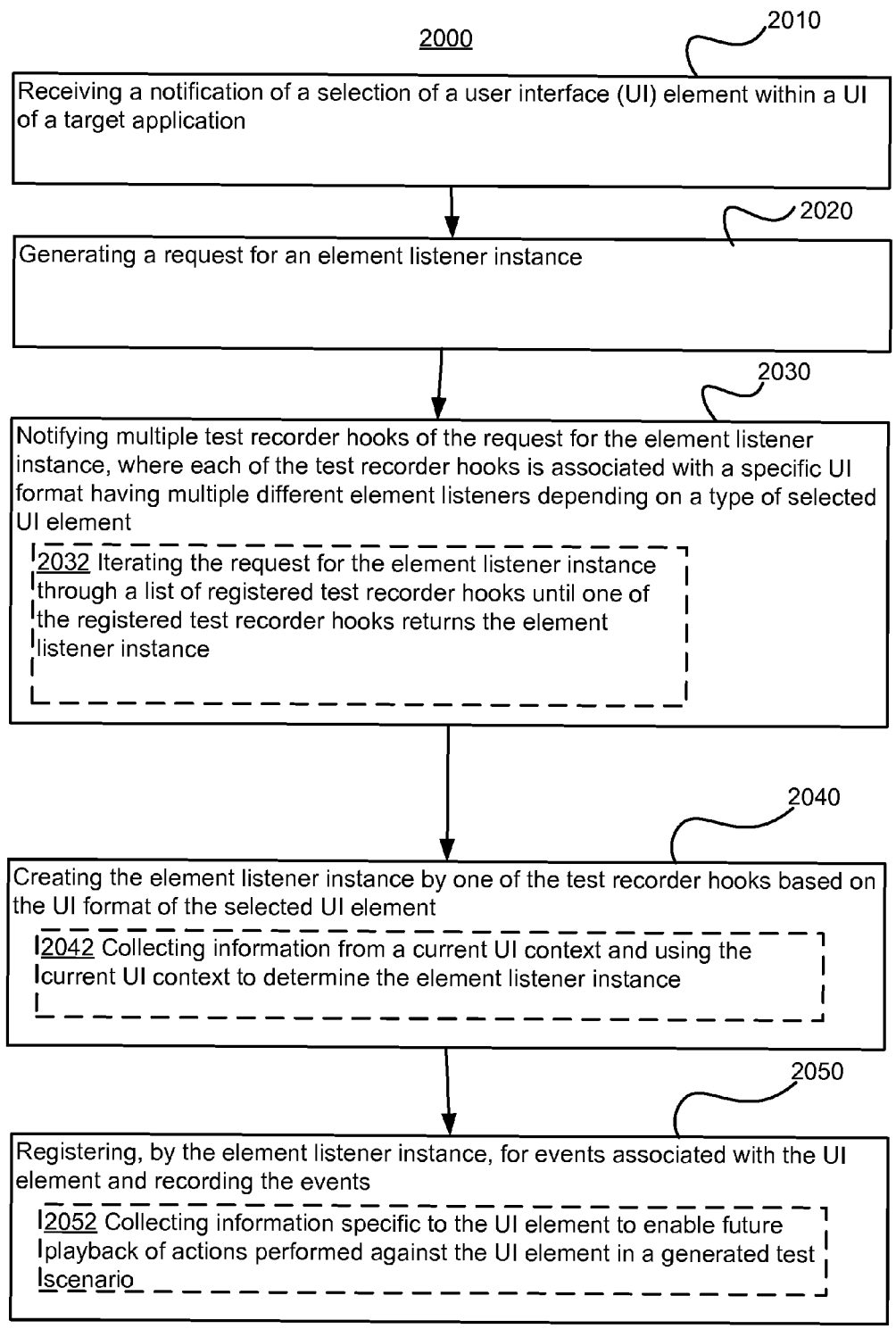
FIG. 20 is an exemplary flow chart of a process illustrating example operations of the system of FIG. 1.

Referring to FIG. 20, an exemplary flowchart of a process 2000 illustrates example operations of the system of FIG. 1. Process 2000 includes receiving a notification of a selection of a UI element within a UI of a target application (2010) and generating a request for an element listener instance (2020). For example, the recorder interface 114 of FIG. 1 may receive a notification of a selection of a UI element within a UI of a target application (e.g., a user interface element 82 within the target application 80 of FIG. 1) (2010). The recorder interface 114 may generate the request for an element listener instance (2020).

Process 2000 also includes notifying multiple test recorder hooks of the request for the element listener instance, where each of the test recorder hooks is associated with a specific UI format having multiple different element listeners depending on a type of selected UI element (2030). Notifying the multiple test recorder hooks may include iterating the request for the element listener instance through a list of registered test recorder hooks until one of the registered test recorder hooks returns element listener instance (2032). For example, the recorder interface 114 of FIG. 1 may notify multiple test recorder hooks 120 of FIG. 1 of the request for the element listener, where each of the test recorder hooks 120 is associated with a specific UI format having multiple different element listeners 130 of FIG. 1 depending on a type of selected UI element (2030).

Process 2000 includes creating the element listener instance by one of the test recorder hooks based on the UI format of the selected UI element (2040). For example, the test recorder hook 120 is configured to create the element listener instance based on the UI format of the selected UI element (2040). Creating the element listener instance may include collecting information from a current UI context and using the current UI context to determine the element listener instance (2042).

Process 2000 includes registering, by the element listener instance, for events associated with the UI element and recording the events (2050). Registering for events may include collecting information specific to the UI element to enable future playback of actions performed against the UI element in a generated test scenario (2052). For example, the element listener instance 130 of FIG. 1 may register for events associated with the UI element (2050) and may collect information specific to the UI element to enable future playback of actions performed against the UI element in a generated test scenario (2052).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a non-transitory machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method including executing instructions recorded on a non-transitory computer-readable storage media using at least one processor, the method comprising:
    receiving a notification of a selection of an user interface (UI) element within a UI of a target application;
    generating a request for an element listener instance;
    notifying multiple test recorder hooks of the request for the element listener instance, wherein each of the test recorder hooks is associated with a specific UI format having multiple different element listeners depending on a type of selected UI element;
    creating the element listener instance by one of the test recorder hooks based on the UI format and the selected UI element;
    registering, by the element listener instance, for events associated with the UI element; and
    recording the events.

2. The method as in claim 1 wherein notifying the multiple test recorder hooks comprises iterating the request for the element listener instance through a list of registered test recorder hooks until one of the registered test recorder hooks returns the element listener instance.

3. The method as in claim 1 wherein creating the element listener instance comprises:
    collecting information from a current UI context, and
    using the current UI context to determine the element listener instance.

4. The method as in claim 1 wherein registering the events associated with the UI element comprises collecting information specific to the UI element to enable future playback of actions performed against the UI element in a generated test scenario.

5. The method as in claim 4 further comprising:
    capturing semantics of the UI element within the UI of the target application; and
    generating one or more tests having test components using the semantics.

6. The method as in claim 4 further comprising:
    encapsulating the collected information and creating an instance of the encapsulated collected information; and
    adding the instance of the encapsulated collected information to a repository to enable generation of the test scenario using the instance of the encapsulated collected information.

7. The method as in claim 1 further comprising highlighting the UI element for which the element listener instance was created.

8. A non-transitory computer-readable storage medium storing instructions that when executed cause a processor to perform a process, the instructions comprising instructions to:
    receive a notification of a selection of an user interface (UI) element within a UI of a target application;
    generate a request for an element listener instance;
    notify multiple test recorder hooks of the request for the element listener instance, wherein each of the test recorder hooks is associated with a specific UI format having multiple different element listeners depending on a type of selected UI element;
    create the element listener instance by one of the test recorder hooks based on the UI format and the selected UI element;

register, by the element listener instance, for events associated with the UI element; and record the events.

9. The non-transitory computer-readable storage medium of claim 8 wherein the instructions to notify the multiple test recorder hooks comprise instructions to iterate the request for the element listener instance through a list of registered test recorder hooks until one of the registered test recorder hooks returns the element listener instance.

10. The non-transitory computer-readable storage medium of claim 8 wherein the instructions to create the element listener instance comprise instructions to:

collect information from a current UI context, and use the current UI context to determine the element listener instance.

11. The non-transitory computer-readable storage medium of claim 8 wherein the instructions to register the events associated with the UI element comprise instructions to collect information specific to the UI element to enable future playback of actions performed against the UI element in a generated test scenario.

12. The non-transitory computer-readable storage medium of claim 11 further comprising instructions to:

capture semantics of the UI element within the UI of the target application; and generate one or more tests having test components using the semantics.

13. The non-transitory computer-readable storage medium of claim 11 further comprising instructions to:

encapsulate the collected information and creating an instance of the encapsulated collected information; and add the instance of the encapsulated collected information to a repository to enable generation of the test scenario using the instance of the encapsulated collected information.

14. The non-transitory computer-readable storage medium of claim 8 further comprising instructions to highlight the UI element for which the element listener instance was created.

15. A computer system including instructions stored on a non-transitory computer-readable storage medium, the computer system comprising:

a recorder interface configured to:

receive a notification of a selection of an user interface (UI) element within a UI of a target application, generate a request for an element listener instance, and notify multiple test recorder hooks of the request for the element listener instance;

multiple test recorder hooks, wherein each of the test recorder hooks is associated with a specific UI format having multiple different element listeners depending on a type of selected UI element and is configured to create the element listener instance based on the UI format and the selected UI element; and the element listener instance configured to register for events associated with the UI element and to record the events.

16. The computer system of claim 15 wherein the recorder interface is configured to iterate the request for the element listener instance through a list of registered test recorder hooks until one of the registered test recorder hooks returns the element listener instance.

17. The computer system of claim 15 wherein the test recorder hook is configured to:

collect information from a current UI context, and use the current UI context to determine the element listener instance.

18. The computer system of claim 15 wherein the element listener instance is configured to collect information specific to the UI element to enable future playback of actions performed against the UI element in a generated test scenario.

19. The computer system of claim 18 wherein the element listener instance is configured to capture semantics of the UI element with the UI of the target application and generate one or more tests having test components using the semantics.

20. The computer system of claim 18 further comprising an entry interface configured to:

encapsulate the collected information and create an instance of the encapsulated collected information; and add the instance of the encapsulated collected information to a repository to enable generation of the test scenario using the instance of the encapsulated collected information.

* * * * *